(12) United States Patent
Lim et al.

(10) Patent No.: US 11,943,646 B2
(45) Date of Patent: Mar. 26, 2024

(54) ENHANCED NDPA FRAME FOR SENSING

(71) Applicant: LG ELECTRONICS INC., Seoul (KR)

(72) Inventors: Dongguk Lim, Seoul (KR); Jinsoo Choi, Seoul (KR); Insun Jang, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/471,195

(22) Filed: Sep. 20, 2023

(65) Prior Publication Data

US 2024/0022934 A1    Jan. 18, 2024

Related U.S. Application Data

(63) Continuation of application No. PCT/KR2022/003999, filed on Mar. 22, 2022.

(60) Provisional application No. 63/164,455, filed on Mar. 22, 2021, provisional application No. 63/244,744, filed on Sep. 16, 2021, provisional application No. 63/248,979, filed on Sep. 27, 2021, provisional application No. 63/251,048, filed on Oct. 1, 2021, provisional application No. 63/281,083, filed on Nov. 19, 2021, provisional application No. 63/283,295, filed on Nov. 26, 2021, provisional application No. 63/307,998, filed on Feb. 8, 2022.

(51) Int. Cl.
*H04W 84/12* (2009.01)
*G01S 7/00* (2006.01)
*G01S 13/86* (2006.01)
*H04W 24/08* (2009.01)

(52) U.S. Cl.
CPC .............. *H04W 24/08* (2013.01); *G01S 7/006* (2013.01); *G01S 13/86* (2013.01); *H04W 84/12* (2013.01)

(58) Field of Classification Search
CPC ....... G01S 7/006; G01S 13/86; H04B 7/0413; H04B 7/0417; H04B 7/0452; H04B 7/0617; H04B 7/0626; H04L 5/0048; H04L 5/005; H04L 5/0057; H04L 69/04; H04L 69/08; H04L 69/22; H04W 24/08; H04W 24/10; H04W 72/0446; H04W 80/02; H04W 84/12
See application file for complete search history.

(56) References Cited

U.S. PATENT DOCUMENTS 9,960,824 B2 * 5/2018 Hedayat ............... H04B 7/0452
10,935,664 B2 * 3/2021 Berger ..................... G01S 11/02
11,483,048 B2 * 10/2022 Yu ......................... H04B 7/0695
(Continued)

OTHER PUBLICATIONS

Lim et al., Consideration for NDPA in 11BF, IEEE 802.11-21/1751r0, 26 pages, Nov. 2021.*

*Primary Examiner* — Frank Duong
(74) *Attorney, Agent, or Firm* — LEE, HONG, DEGERMAN, KANG & WAIMEY

(57) ABSTRACT

The present specification proposes NDPA frame formats supported in a next generation wireless LAN system. According to one embodiment of the present specification, the NDPA frame formats may include common information for sensing. Here, the common information may be included in a special user information field. According to another embodiment of the present specification, the NDPA frame formats may use an existing NDPA frame format.

15 Claims, 19 Drawing Sheets

(56) References Cited

U.S. PATENT DOCUMENTS

| | | | | |
|---|---|---|---|---|
| 2015/0311964 A1* | 10/2015 | Sohn | ............ | H04B 7/0617 |
| | | | | 370/338 |
| 2017/0054542 A1* | 2/2017 | Vermani | ............ | H04B 7/0626 |
| 2017/0170937 A1* | 6/2017 | Chun | ............ | H04L 5/0094 |
| 2021/0409078 A1* | 12/2021 | Jeon | ............ | H04L 69/08 |
| 2023/0132850 A1* | 5/2023 | Liu | ............ | G01S 13/56 |
| | | | | 342/58 |
| 2023/0319877 A1* | 10/2023 | Chitrakar | ............ | H04W 24/10 |
| | | | | 370/329 |

* cited by examiner

FIG. 8

| L-STF | L-CEF | L-Header | EDMG-Header-A | EDMG-STF | EDMG-CEF |

FIG. 9

| L-STF | L-CEF | L-Header | EDMG-Header-A | EDMG-CEF |

FIG. 10

| L-STF | L-CEF | L-Header | EDMG-Header-A | EDMG-STF | EDMG-CEF | TRN |

FIG. 11

| L-STF | L-CEF | L-Header | EDMG-Header-A | EDMG-STF | TRN |

ENHANCED NDPA FRAME FOR SENSING

CROSS-REFERENCE TO RELATED APPLICATIONS

This application is a continuation of International Application No. PCT/KR2022/003999, filed on Mar. 22, 2022, which claims the benefit of U.S. Provisional Application No. 63/164,455, filed on Mar. 22, 2021, 63/244,744, filed on Sep. 16, 2021, 63/248,979, filed on Sep. 27, 2021, 63/251,048, filed on Oct. 1, 2021, 63/281,083, filed on Nov. 19, 2021, 63/283,295, filed on Nov. 26, 2021, and 63/307,998, filed on Feb. 8, 2022, the contents of which are all incorporated by reference herein in their entirety.

TECHNICAL FIELD

The present disclosure relates to a wireless LAN system, and more particularly to a wireless LAN sensing procedure.

BACKGROUND

A wireless local area network (WLAN) has been enhanced in various ways. For example, IEEE 802.1 lbf WLAN sensing is the first standard which converges communication and radar technologies. Although there is a rapid increase in a demand for unlicensed frequencies in daily life throughout overall industries, due to a limitation in frequencies to be newly provided, it is very preferable to develop the technology of converging the communication and the radar in terms of increasing frequency utilization efficiency. A sensing technology which detects a movement behind a wall by using a WLAN signal or a radar technology which detects an in-vehicle movement by using a frequency modulated continuous wave (FMCW) signal at a 70 GHz band has been conventionally developed, but it may have significant meaning in that sensing performance can be raised up by one step in association with the IEEE 802.1 lbf standard. In particular, since privacy protection is increasingly emphasized in modern society, a WLAN sensing technology which is legally freer from invasion of privacy is more expected, unlike CCTV.

Meanwhile, an overall radar market throughout automobiles, national defense, industries, daily life, or the like is expected to grow until an average annual growth rate reaches up to a level of about 5% by 2025. In particular, in case of a sensor used in daily life, it is expected to rapidly grow up to a level of 70%. Since the WLAN sensing technology is applicable to a wide range of daily life such as motion detection, breathing monitoring, positioning/tracking, fall detection, in-vehicle infant detection, appearance/proximity recognition, personal identification, body motion recognition, behavior recognition, or the like, it is expected to contribute to enhancing competitiveness of companies.

For example, the WLAN sensing proposed herein may be used to sense the movement or gesture of an object. Specifically, the WLAN STA may sense the movement or gesture of an object based on measurement results of various types of frames/packets designed for WLAN sensing.

SUMMARY

The present disclosure proposes NDPA frame formats to be supported in next generation wireless LAN systems. According to one embodiment of the present disclosure, the NDPA frame formats may include common information for sensing. Here, the common information may be contained in a special user information field. According to another embodiment of the present disclosure, the NDPA frame formats may utilize existing NDPA frame formats.

According to the present disclosure, a novel method for identifying NDPA frames for sensing in a next-generation wireless LAN system is proposed. According to one embodiment of the present disclosure, without designing new NDPA frames, NDPA frames for sensing may include common information related to sensing. Thus, the signaling overhead associated with sensing may be reduced.

BRIEF DESCRIPTION OF THE DRAWINGS

FIG. 8 shows an example of a sensing frame format.

FIG. 9 shows another example of a sensing frame format.

FIG. 10 shows yet another example of a sensing frame format.

FIG. 11 shows yet another example of a sensing frame format.

DETAILED DESCRIPTION

In the present specification, "A or B" may mean "only A", "only B" or "both A and B". In other words, in the present specification, "A or B" may be interpreted as "A and/or B".

For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed WLAN sensing standard or IEEE 802.1 lbf standard.

Hereinafter, in order to describe a technical feature of the present specification, a technical feature applicable to the present specification will be described.

A WLAN sensing technology is a sort of radar technologies which can be implemented without a standard, but it is conceived that more powerful performance can be obtained through standardization. The IEEE 802.1 lbf standard defines an apparatus/device participating in wireless LAN sensing for each function as shown in the following table. According to the function thereof, the apparatus may be classified into an apparatus initiating WLAN sensing and an apparatus participating in the sensing, an apparatus transmitting a sensing physical layer protocol data unit (PPDU) and an apparatus receiving the PPDU.

TABLE 1

| Terminology | Function |
| --- | --- |
| Sensing Initiator | apparatus/device initiating sensing |
| Sensing Responder | apparatus/device participating in sensing |
| Sensing Transmitter | apparatus/device transmitting sensing PPDU |
| Sensing Receiver | apparatus/device receiving sensing PPDU |

Figure 1:
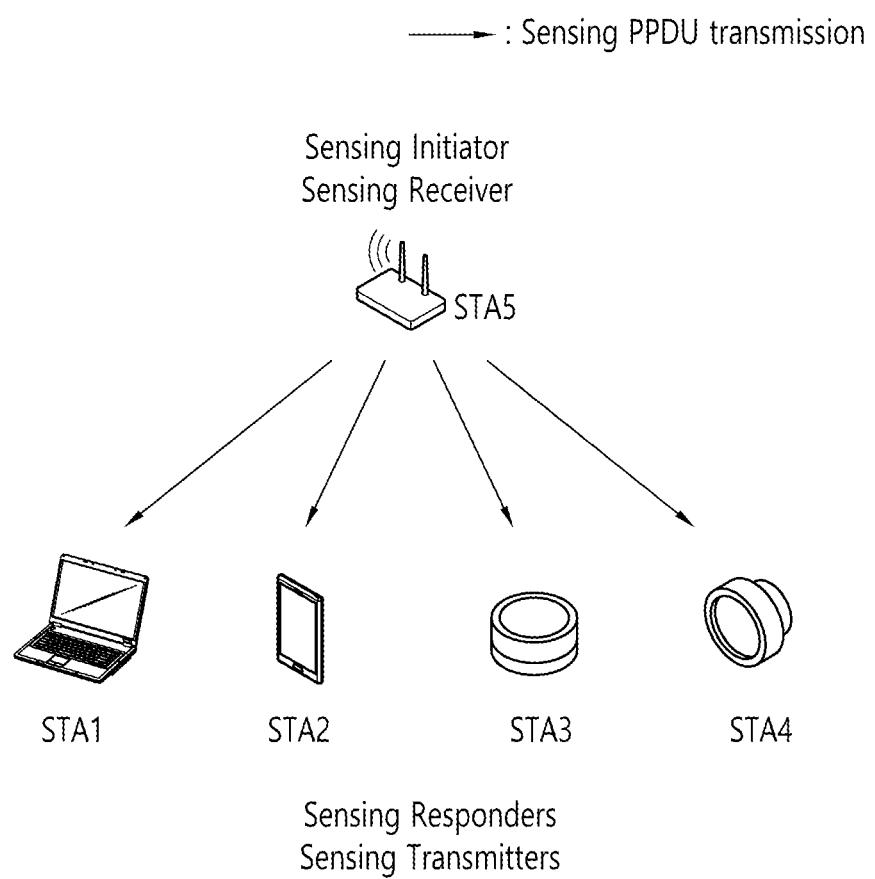
FIG. 1 shows an exemplary WLAN sensing scenario using multiple sensing transmitting devices.

FIG. 1 illustrates an example of a WLAN sensing scenario using multiple sensing transmitting apparatuses/devices.

Figure 2:
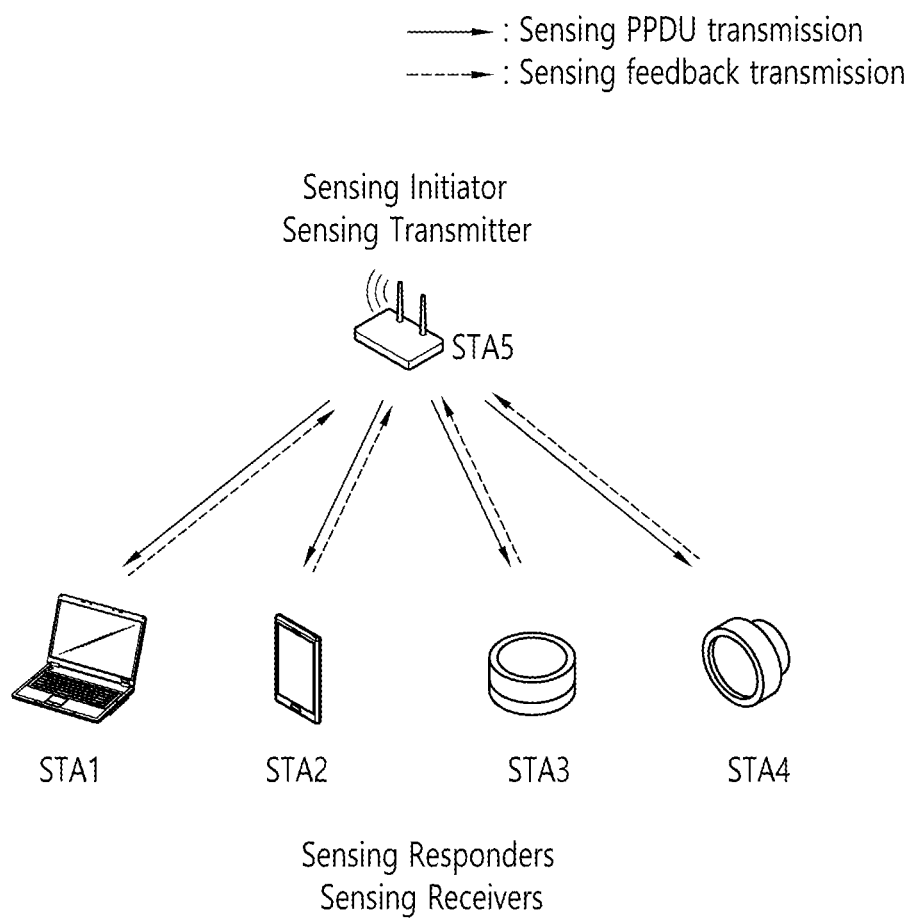
FIG. 2 shows an exemplary WLAN sensing scenario using multiple sensing receiving devices.

FIG. 2 illustrates an example of a WLAN sensing scenario using multiple sensing receiving apparatuses/devices.

FIG. 1 and FIG. 2 illustrate a sensing scenario based on a function and deployment of a WLAN sensing apparatus/device. In an environment assuming one sensing initiation apparatus and multiple sensing participating apparatuses, FIG. 1 is a scenario using multiple sensing PPDU transmitting apparatuses, and FIG. 2 is a scenario using multiple sensing PPDU receiving apparatuses. Assuming that the sensing PPDU receiving apparatus includes a sensing measurement signal processing apparatus, in case of FIG. 2, a procedure for transmitting (feeding back) a sensing measurement result to the sensing initiation apparatus (STA 5) is additionally required.

Figure 3:
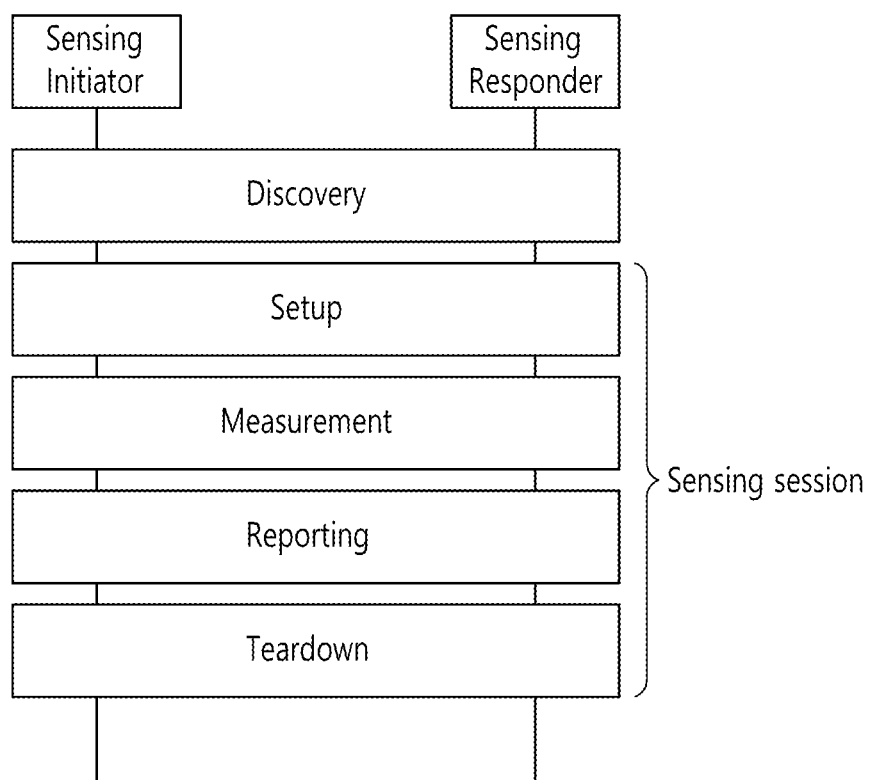
FIG. 3 shows an example of a WLAN sensing procedure.

FIG. 3 illustrates an example of a WLAN sensing procedure.

A procedure of WLAN sensing is performed as discovery, negotiation, measurement exchange, tear down, or the like between WLAN sensing initiation apparatus/device and participating apparatuses/devices. The discovery is a process of identifying sensing capability of WLAN apparatuses. The negotiation is a process of determining a sensing parameter between the sensing initiation apparatus and participating apparatus. The measurement exchange is a process of transmitting a sensing PPDU and transmitting a sensing measurement result. The tear down is a process of terminating the sensing procedure.

Figure 4:
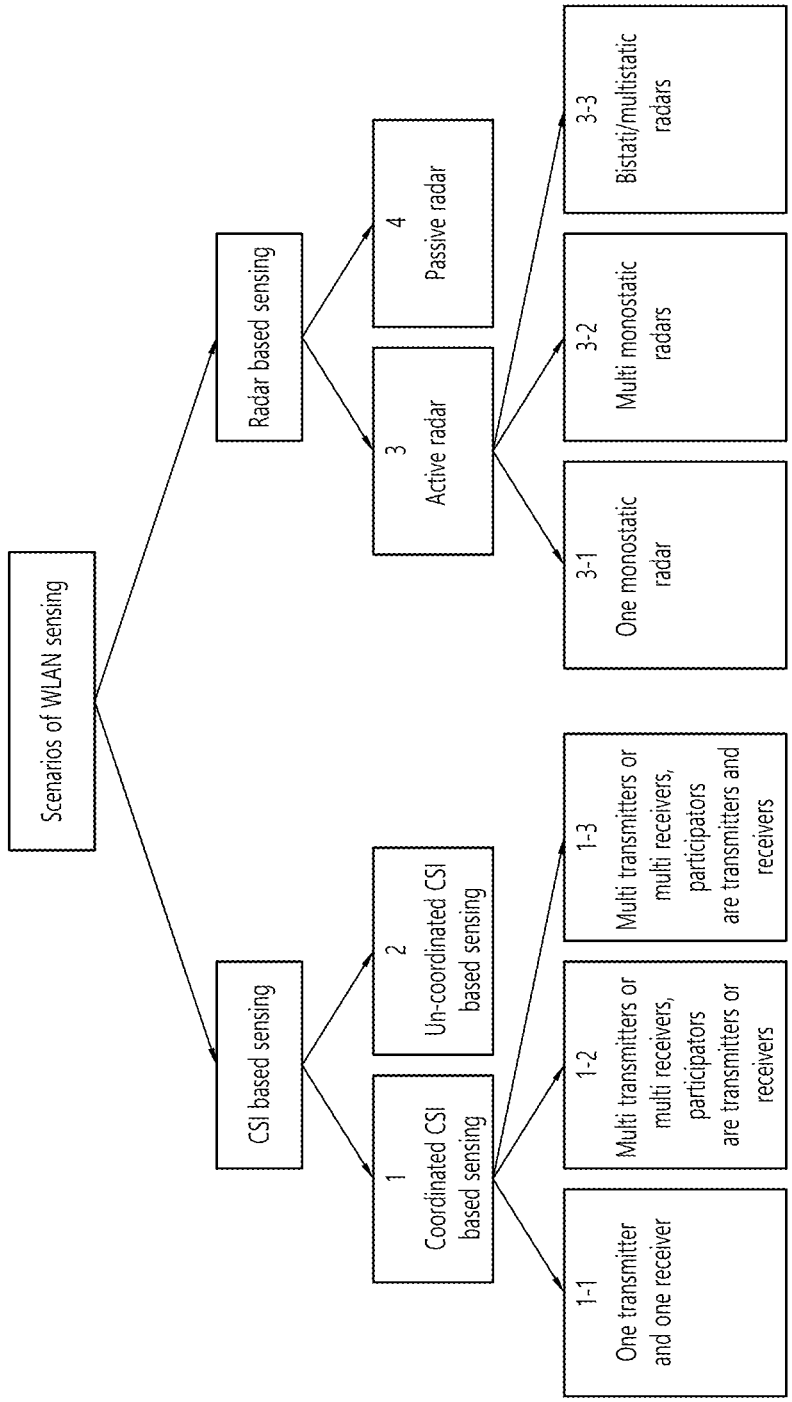
FIG. 4 is an exemplary classification of WLAN sensing.

FIG. 4 is an example of classifying WLAN sensing.

The WLAN sensing may be classified into CSI-based sensing which uses channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 5:
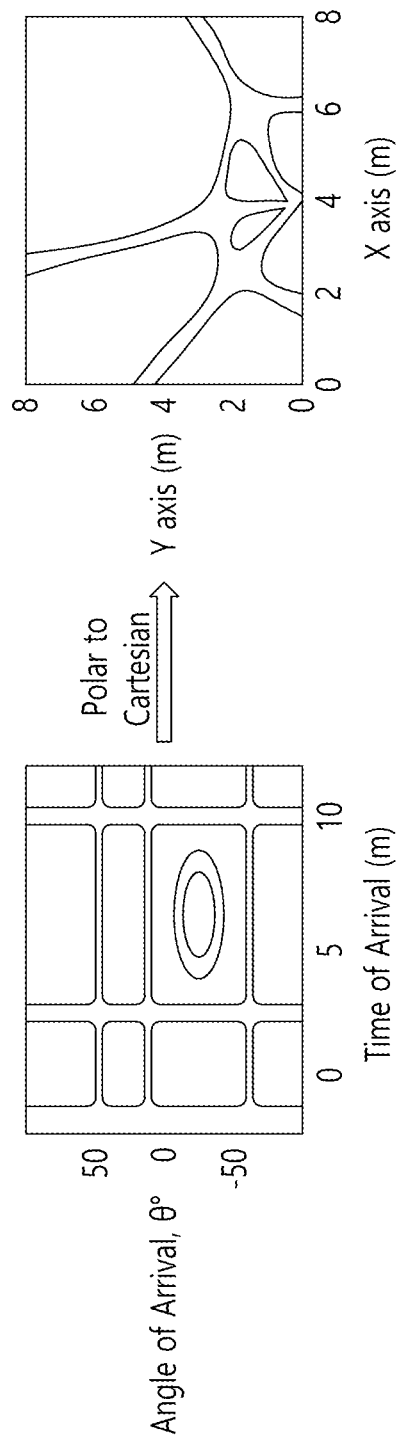
FIG. 5 shows indoor positioning using CSI-based WLAN sensing.

FIG. 5 illustrates indoor positioning which uses CSI-based WLAN sensing.

In FIG. 5, the CSI-based WLAN sensing is utilized in the indoor positioning. An angle of arrival and a time of arrival are obtained by using CSI, and then are converted into an orthogonal coordinate to obtain indoor positioning information.

Figure 6:
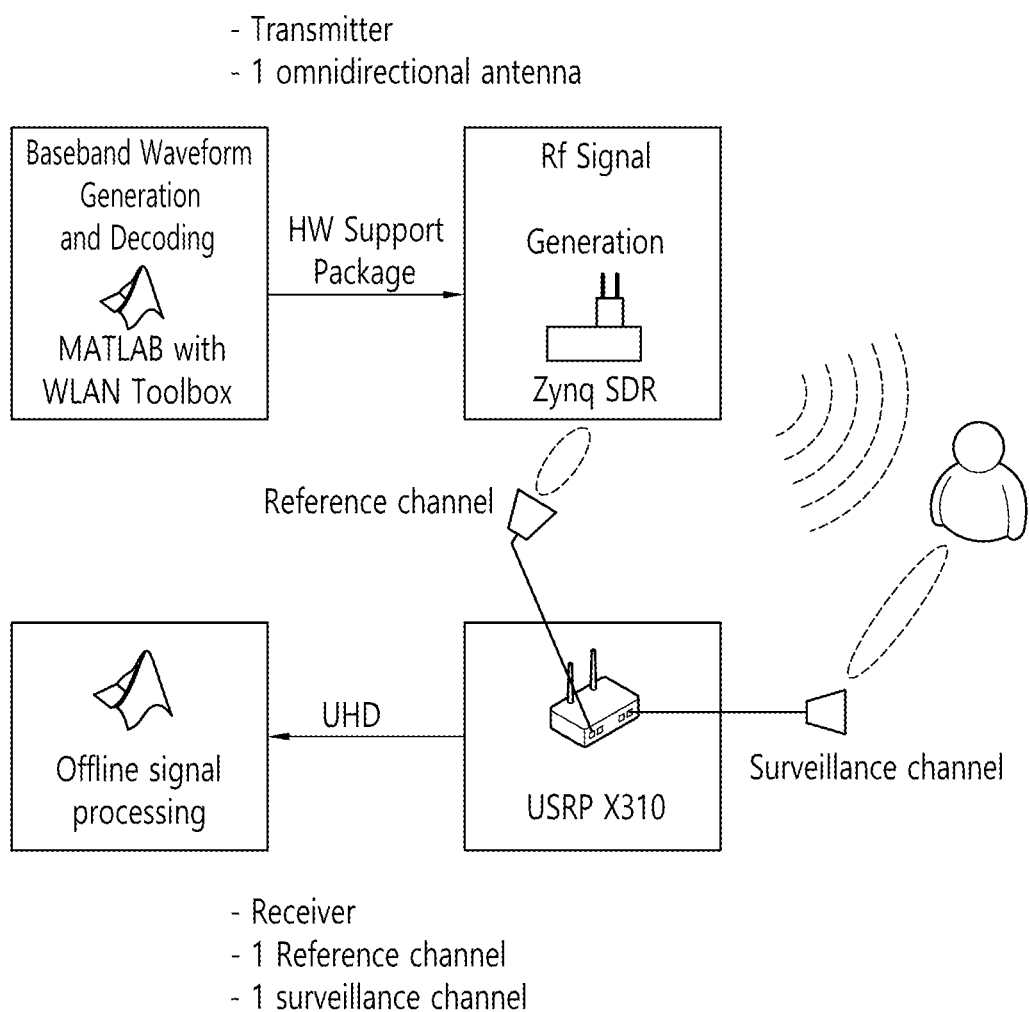
FIG. 6 is an exemplary implementation of a WLAN sensing device.

FIG. 6 is an example of implementing a WLAN sensing apparatus/device.

In FIG. 6, the WLAN sensing apparatus/device is implemented using a MATLAB toolbox, Zynq, and USRP. An IEEE 802.11ax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus/device, it is possible to obtain a unique feature capable of identifying a motion or a body action.

The IEEE 802.1 lbf WLAN sensing standardization is in an initial stage of development at present, and it is expected that a cooperative sensing technology for improving sensing accuracy will be treated to be important in the future. It is expected that a synchronization technology of a sensing signal for cooperative sensing, a CSI management and usage technology, a sensing parameter negotiation and sharing technology, a scheduling technology for CSI generation, or the like will be a core subject for standardization. In addition, it is also expected that a long-distance sensing technology, a low-power sensing technology, a sensing security and privacy protection technology, or the like will be reviewed as a main agenda.

IEEE 802.1 lbf WLAN sensing is a sort of radar technologies using a WLAN signal which exists anywhere anytime. The following table shows a typical case of using IEEE 802.1 lbf, which may be utilized in a wide range of daily life such as indoor detection, motion recognition, health care, 3D vision, in-vehicle detection, or the like. Since it is mainly used indoors, an operating range is usually within 10 to 20 meters, and distance accuracy does not exceed up to 2 meters.

TABLE 2

| Name | details | Max range (m) | Key Performance Indicator | Range Accuracy (m) | Max Velocity (m/s)/Velocity Accuracy | angular Accuracy (deg) |
|---|---|---|---|---|---|---|
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Identification of a gesture from a set of gestures - range >0.5 m | 2 | Gesture Detection | | | |
| Gesture recognition - large range (full body movement) | Identification of a gesture from a set of gestures - range >2 m | 7 | Gesture Detection | 0.2 | 2/0.1 | 5 |
| A liveliness detection | Determination whether a close by object is alive or not | 1 | A liveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/Pulse Accuracy | 0.5 | 2/0.1 | |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| Surveillance/ Monito ring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/detection aid | 3 | Fast detection of driver sleepiness | 0.01 | 1/0.1 | 3 |

In IEEE 802.11, a technology that is capable of sensing movement (or motion) or gesture of an object (person or object) by using Wi-fi signals of various bands is being discussed. For example, it is possible to sense the movement (or motion) or gesture of an object (person or object) by using Wi-fi signals (e.g., 802.11ad or 802.11ay signals) of a 60 GHz band. Additionally, it is also possible to sense the movement (or motion) or gesture of an object (person or object) by using Wi-fi signals (e.g., 802.11ac, 802.11ax, 802.11be signals) of a sub-7 GHz band.

Hereinafter, technical features of a PPDU according to the 802.11ay standard, which is one of Wi-fi signals of the 60 GHz band that may be used for WLAN sensing, will be described in detail.

Figure 7:
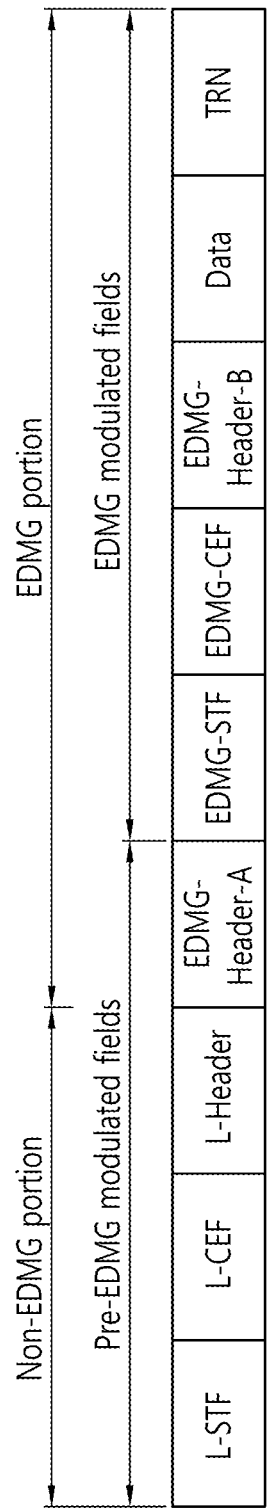
FIG. 7 is a diagram showing a simple PPDU structure that is supported in an 802.11ay WLAN system.

FIG. 7 briefly illustrates a PPDU structure supported in an 802.11ay WLAN system.

As shown in FIG. 7, the PPDU format applicable to the 11ay system may include L-STF, L-CEF, L-Header, EDMG-Header-A, EDMG-STF, EDMG-CEF, EDMG-Header-B, Data, and TRN fields, and the aforementioned fields may be selectively included in accordance with the format of the PPDU (e.g., SU PPDU, MU PPDU, etc.).

Herein, a portion including the L-STF, L-CEF, and L-header fields may be referred to as a non-EDMG portion, and the remaining portion may be referred to as an EDMG portion. Additionally, the L-STF, L-CEF, L-Header, and EDMG-Header-A fields may be referred to as pre-EDMG modulated fields, and the remaining portions may be referred to as EDMG modulated fields.

The EDMG-Header-A field includes information required to demodulate an EDMG PPDU. The definition of the EDMG-Header-A field is the same as those of the EDMG SC mode PPDU and the EDMG OFDM mode PPDU, but is different from the definition of the EDMG control mode PPDU.

A structure of EDMG-STF depends on the number of consecutive 2.16 GHz channels through which the EDMG PPDU is transmitted and an index $i_{STS}$ of an $i_{STS}$-th space-time stream. For single space-time stream EDMG PPDU transmission using an EDMG SC mode through one 2.16 GHz channel, an EDMG-STF field does not exist. For EDMG SC transmission, the EDMG-STF field shall be modulated using pi/(2-BPSK).

A structure of EDMG-CEF depends on the number of consecutive 2.16 GHz channels through which the EDMG PPDU is transmitted and the number of space-time streams $i_{STS}$. For single space-time stream EDMG PPDU transmission using the EDMG SC mode through one 2.16 GHz channel, an EDMG-CEF field does not exist. For EDMG SC transmission, the EDMG-CEF field shall be modulated using pi/(2-BPSK).

A (legacy) preamble part of the PPDU may be used for packet detection, automatic gain control (AGC), frequency offset estimation, synchronization, indication of modulation (SC or OFDM) and channel estimation. A format of the preamble may be common to both an OFDM packet and an SC packet. In this case, the preamble may be constructed of a short training field (STF) and a channel estimation (CE) field located after the STF field.

Hereinafter, an example of a sensing frame format that is proposed for performing sensing at a 60 GHz band or WLAN sensing will be described in detail. A frame, packet, and/or data unit that is used for performing the sensing proposed in the present specification or the WLAN sensing may also be referred to as a sensing frame. The sensing frame may also be referred to by using other various terms, such as sensing measurement frame, sensing operation frame, and/or measurement frame, and so on.

FIG. 8 shows an example of a sensing frame format.

A Wi-Fi Sensing signal may be transmitted/received for channel estimation between an AP/STA and an STA by using a Wi-Fi signal of 60 GHz. At this point, in order to support backward capability with the existing 60 GHz Wi-Fi signal 802.11ad and 802.11ay, a sensing frame may be configured of a frame format that is shown in FIG. 8, which include a non-EDMG preamble portion (i.e., L-STF, L-CEF, L-Header).

As shown in FIG. 8, a sensing frame may be configured of L-STF, L-CEF, L-Header, EDMG-Header A, EDMG-STF, EDMG-CEF.

That is, since the sensing frame performs sensing on an STA or object by estimating a change in channel between Point to point (P2P) or point to multipoint (P2MP), unlike the conventional EDMG frame, the sensing frame may be configured without including a data field.

Since an EDMG frame may be transmitted by using one or more channels of a 60 GHz band (i.e., various channel bandwidths), as shown in FIG. 8, the sensing frame may be configured to include EDMG-STF and EDMG-CEF fields.

An STA/AP may perform accurate channel information measurement in a sensing transmission/reception bandwidth (BW) by using the EDMG-STF and EDMG-CEF fields.

Information on the BW that is used for the sensing may be transmitted through EDMG-header A. And, at this point, the corresponding information may be transmitted by using various BWs as shown below in the following table.

TABLE 3

| Index | BW |
|---|---|
| 1 | 2.16 GHz |
| 2 | 4.32 GHz |
| 3 | 6.48 GHz |
| 4 | 8.64 GHz |
| 5 | 2.16 + 2.16 GHz (non-contiguous) |
| 6 | 4.32 + 4.32 GHz (non-contiguous) |

FIG. 9 shows another example of a sensing frame format.

Unlike what is described above, a sensing signal may be transmitted by using only a fixed BW (e.g., 2.16 GHz). And, in this case, since additional AGC, and so on, is/are not needed, the EDMG-STF may be omitted. When performing sensing by using only a predetermined BW, the EDMG-STF may be omitted, thereby configuring a sensing frame format, as shown in FIG. 9. Additionally, since only a predetermined BW is used, when performing sensing, unlike the conventional format, the EDMG-header may not include a BW field.

FIG. 10 shows yet another example of a sensing frame format.

At 60 GHz, an 802.11ay transmission basically transmits a signal by using beamforming. And, at this point, in order to configure an optimal beam between Tx and Rx, an antenna weight vector (AWV) is configured by using a training (i.e., TRN) field. Therefore, since the sensing frame transmits a signal by using a predetermined AWV, it is difficult for the sensing frame to accurately apply the changed channel situation. Therefore, in order to more accurately measure any change in the channel, the sensing frame may be configured to include the TRN field, as shown below. At this point, the information on the channel may be measured through the TRN field.

In FIG. 10, the sensing frame does not include a data field, and since the sensing frame performs channel measurement for the sensing by using the TRN, the above-described EDMG-CEF field for performing channel estimation may be omitted. Therefore, the sensing frame format may be configured as described below in FIG. 11.

FIG. 11 shows yet another example of a sensing frame format.

Hereinafter, the technical features of a PPDU according to a Wi-fi signal of sub-7 GHz that may be used for WLAN sensing will be described in detail.

Hereinafter, an example of a sensing frame format that is proposed for sensing in a sub-7 GHz band or WLAN sensing will be described. For example, for the sensing according to the present specification, various PPDUs of 2.4 GHz, 5 GHz, 6 GHz bands may be used. For example, PPDUs according to the IEEE 802.11ac, 802.11ax, and/or 802.11be standard(s) may be used as the sensing frame.

Figure 12:
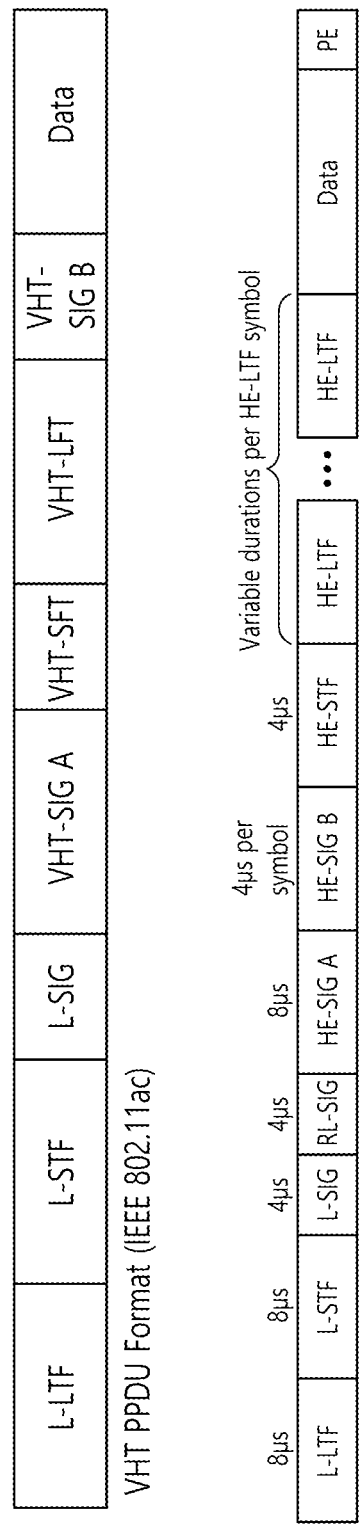
FIG. 12 shows another example of a sensing frame format.

FIG. 12 shows another example of a sensing frame format.

A sensing frame according to the present specification may use only part of the fields shown in FIG. 12. For example, a Data field shown in FIG. 12 may be omitted. Additionally, or alternatively, VHT-SIG B and/or HE-SIG B field(s) shown in FIG. 12 may be omitted.

Figure 13:
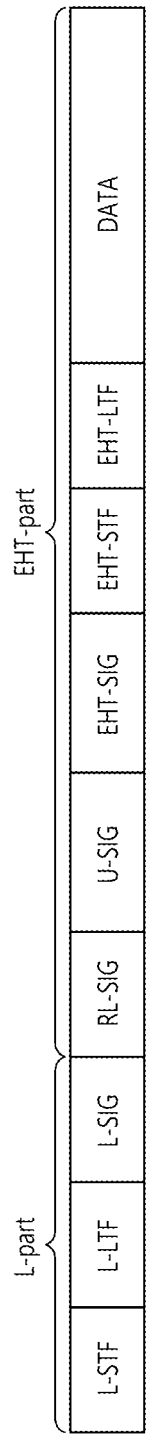
FIG. 13 shows another example of a sensing frame format.

FIG. 13 shows another example of a sensing frame format.

A sensing frame according to the present specification may use only part of the fields of an Extreme High Throughput (EHT) PPDU shown in FIG. 13. For example, a Data field shown in FIG. 13 may be omitted.

The PPDU of FIG. 13 may represent part or all of a PPDU type that is used in an EHT system. For example, the example of FIG. 13 may be used for both single-user (SU) mode and multi-user (MU) mode. In other words, the PPDU of FIG. 13 may be a PPDU for one receiving STA or a PPDU for multiple receiving STAs. When the PPDU of FIG. 13 is used for a Trigger-based (TB) mode, an EHT-SIG of FIG. 13 may be omitted. In other words, an STA that has received a Trigger frame for Uplink-MU (UL-MU) communication may transmit a PPDU, from which the EHT-SIG is omitted in the example of FIG. 13.

Subcarrier spacing of the L-LTF, L-STF, L-SIG, RL-SIG, U-SIG, and EHT-SIG fields of FIG. 13 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

In the PPDU of FIG. 13, L-LTF and L-STF may be the same as the fields of the prior art (or related art).

The L-SIG field of FIG. 13 may, for example, include 24 bits of bit information. For example, the 24-bit information may include a 4-bit Rate field, 1 Reserved bit, a 12-bit Length field, 1 bit of Parity bit, and 6 bits of Tail bits. For example, the 12-bit Length field may include information related to a PPDU length or time duration. For example, a value of the 12-bit Length field may be determined based on a type of the PPDU. For example, when the PPDU is a non-HT PPDU, an HT PPDU, a VHT PPDU, or an EHT PPDU, the value of the Length field may be determined as a multiple of 3. For example, when the PPDU is an HE PPDU, the value of the Length field may be determined as "a multiple of 3+1" or "a multiple of 3+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of 3+2".

The transmitting STA may generate an RL-SIG, which is generated identically as the L-SIG. The receiving STA may know that the received PPDU is an HE PPDU or EHT PPDU based on the presence (or existence) of an RL-SIG.

A Universal SIG (U-SIG) may be inserted after the RL-SIG of FIG. 13. The U-SIG may also be referred to by using various terms, such as a first SIG field, a first SIG, a first-type SIG, a control signal, a control signal field, a first (type) control signal, and so on.

The U-SIG may include N-bit information and may also include information for identifying the EHT PPDU type. For example, the U-SIG may be configured based on 2 symbols (e.g., two contiguous OFDM symbols). Each symbol (e.g., OFDM symbol) for the U-SIG may have a duration of 4 us.

Each symbol of the U-SIG may be used for transmitting 26-bit information. For example, each symbol of the U-SIG may be transmitted/received based on 52 data tones and 4 pilot tones.

The U-SIG may be configured of 20 MHz units. For example, when an 80 MHz PPDU is configured, the U-SIG may be duplicated. That is, 4 identical U-SIGs may be included in the 80 MHz PPDU. A PPDU that exceeds the 80 MHz bandwidth may include different U-SIGs.

The EHT-SIG of FIG. 13 may include control information for the receiving STA. For example, the EHT-SIG may include a common field and a user-specific field. The common field may be omitted, and a number of user-specific fields may be determined based on a number of users. The common field may include RU allocation information. The RU allocation information may mean information related to the location of an RU to which multiple users (i.e., multiple receiving STAs) are allocated. The RU allocation information may be configured of 9-bit units. The user-specific field may include information for decoding at least one specified RU (e.g., STA ID information that is allocated to the corresponding RU, MCS index that is applied to the corresponding RU, LDPC/BCC coding type information that is applied to the corresponding RU, and so on) through the common field.

The EHT-STF of FIG. 13 may be used for enhancing automatic gain control estimation in a multiple input multiple output (MIMO) environment or OFDMA environment. And, the EHT-LTF of FIG. 13 may be used for estimating a channel in a MIMO environment or OFDMA environment.

Figure 14:
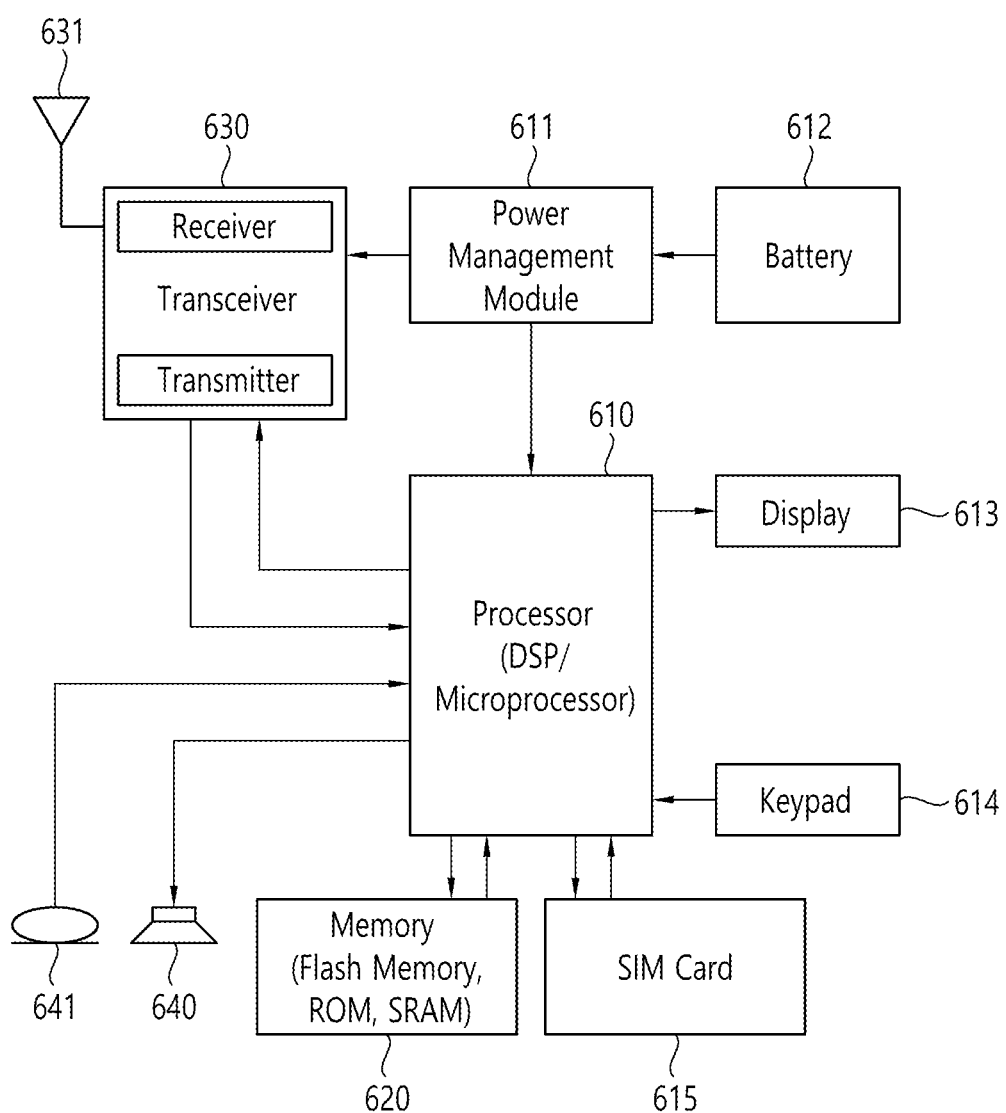
FIG. 14 shows a modified example of a transmitting device and/or receiving device of the present specification.

FIG. 14 shows a modified example of a transmitting device and/or receiving device of the present specification.

The device of FIG. 14 may be referred to by using other various terms, such as mobile terminal, wireless device, Wireless Transmit/Receive Unit (WTRU), User Equipment (UE), Mobile Station (MS), Mobile Subscriber Unit, or, simply, user, and so on. Additionally, the device of FIG. 14 may also be referred to by using other various terms, such as Base Station, Node-B, Access Point (AP), repeater, router, relay, and so on.

A processor 610 of FIG. 14 may instruct (or indicate) and control operations that are performed by the STA, transmitting STA, receiving STA, AP, non-AP, and/or user-STA according to the present specification. For example, the processor 610 may receive a signal from a transceiver 630, process the received signal (Rx signal), generate a transmission signal (Tx signal), and perform a control operation for transmitting the signal. The illustrated processor, memory, and transceiver may be implemented individually as separate chips, or at least two blocks/functions may be implemented through a single chip.

A memory 620 of FIG. 14 may store a signal that is received (i.e., Rx signal) through the transceiver 630 and may store a signal that is to be transmitted (i.e., Tx signal) through the transceiver 630. Additionally, the memory 620 of FIG. 14 may store a signal that is received (i.e., Rx signal) through the transceiver 630 and may store a signal that is to be transmitted (i.e., Tx signal) through the transceiver 630.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs that are to be used by the processor 610. The keypad 614 may be displayed on the display 613. A SIM card 615 may be an integrated circuit that is used to securely store an international mobile subscriber identity (IMSI) and its related key, which are used to identify and authenticate subscribers on mobile telephony devices, such as mobile phones and computers.

Referring to FIG. 14, a speaker 640 may output a result related to a sound processed by the processor 610. And, a microphone 641 may receive an input related to a sound that is to be used by the processor 610.

Hereinafter, the methods proposed herein are described.

The development of a standard technology for sensing STA or human movement or gestures using Wi-Fi signals operating in the sub-7 GHz band is being considered. This specification proposes a method for transmitting NDP frames to a non-AP STA to perform WLAN sensing using Wi-Fi signaling, or for transmitting NDP frames to a non-AP STA, including information about the NDP frames to indicate that the transmitted NDPA frames are NDPA frames for sensing (i.e., Sensing NDPA).

In order to improve the accuracy and resolution of WLAN sensing, WLAN sensing utilizing signal transmission and reception channels between multiple sensing STAs is considered. The sensing STAs may include STAs and APs. Therefore, in order to efficiently perform WLAN sensing using signal transmission and reception channels between a sensing initiator/initiator and multiple sensing responders/respondents, channel estimation for each transmission and reception channel may be required. In order to efficiently perform channel measurement for multiple transmit and receive channels used for sensing, channel estimation using the transmission of null data packet (NDP) frames may be used in the sensing procedure. Information about the transmission of the NDP frames may be included in the NDPA frame.

Figure 15:
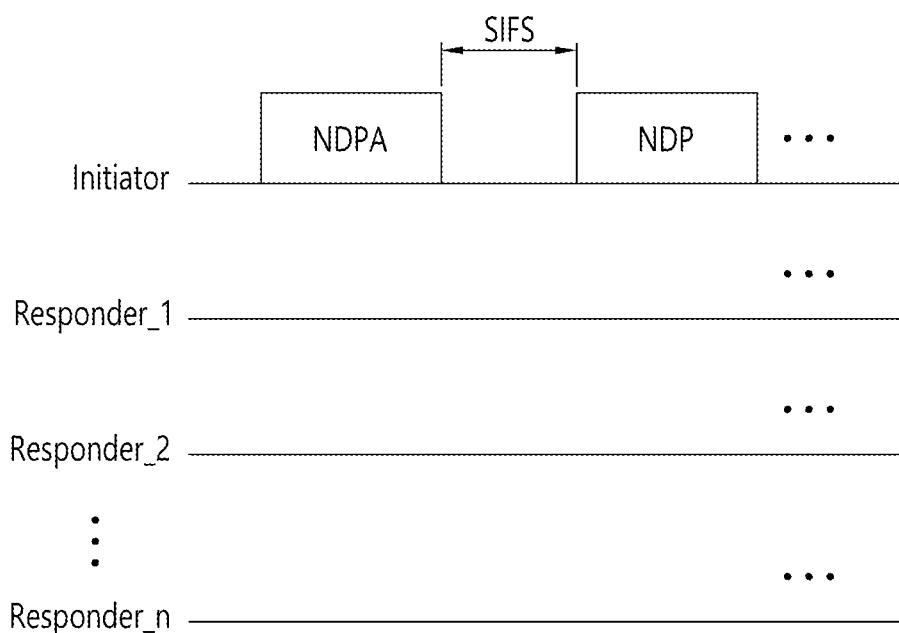
FIG. 15 illustrates one example of a sensing behavior.
Figure 16:
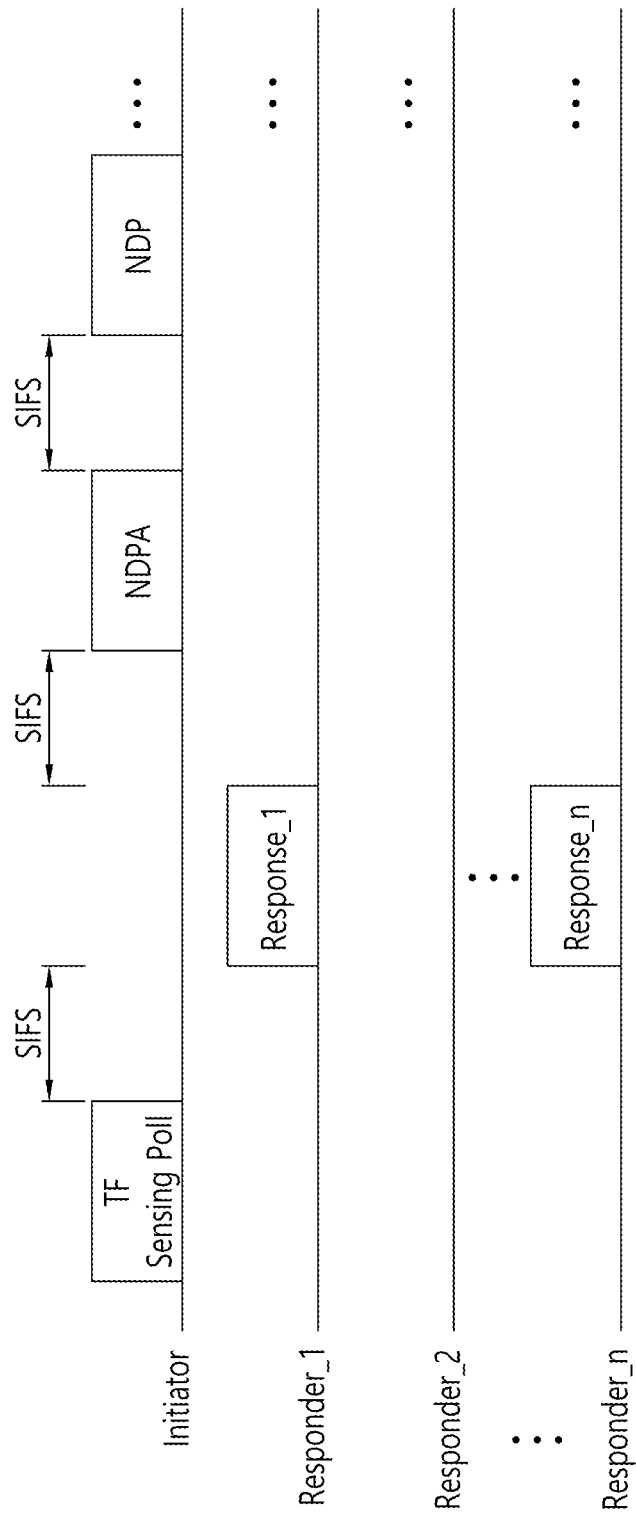
FIG. 16 illustrates another example of sensing operation.

The channel measurement for the sensing operation may be performed as follows. FIG. 15 illustrates an example of a sensing operation. FIG. 16 illustrates another example of a sensing operation. The examples of FIGS. 15 and 16 are examples of sensing measurements, and in these examples, the initiator may be an AP or non-AP STA.

Referring to FIG. 15, if n responders are present, the initiator may transmit an NDPA frame to the n responders. After a SIFS elapses from the time of transmitting the NDPA frame, the initiator may transmit an NDP frame to the n responders.

Alternatively, referring to FIG. 16, if n responders are present, the initiator may transmit a trigger frame (TF) sensing poll frame to the n responders. Some of the n responders may transmit a response frame to the TF sensing poll frame to the initiator. The initiator may transmit an NDPA frame and an NDP frame to the some of the responders that transmitted the response frames. Here, the interval between transmissions of the frames may be SIFS.

As shown in FIG. 15 and/or FIG. 16, for the transmission of the NDP frame, the sensing STA may transmit an NDPA frame to inform about the transmission of the NDP frame. In this case, the NDPA frame may be configured as follows to indicate that the NDP frame transmitted for channel measurement is transmitted for a sensing operation.

Hereinafter, technical features applicable to the construction of the NDPA frame proposed herein are described. The following technical features may be applied alone or in combination.

Technical Feature 1. The Subtype field of the frame control field may be used to indicate the Sensing NDPA.

Technical Feature 1. A. The NDPA frame may be transmitted via a control frame. In this case, the reserved bit of the Subtype field of the control frame may be used for the indication of the Sensing NDPA frame.

Technical Feature 1. A. i. The four bits of B4 to B7 of the Frame control field may be used for the indication of the Sensing NDPA frame. In this case, the reserved values/bits 0000, 0001 or 1111 may be used for the indication of the Sensing NDPA frame.

Technical Feature 1. A. ii. Considering the indication of the NDPA frame, the Frame control field may be configured as follows.

Technical Feature 1. A. ii. 1. For example, if the reserved bit 0001 is used for the indication of the Sensing NDPA frame, the following table may be defined for the Frame control field.

TABLE 4

| Type value (B3 B2) | Type description | Subtype value (B7 B6 B5 B4) | Subtype description |
|---|---|---|---|
| 01 | Control | 0000 | Reserved |
| 01 | Control | 0001 | Sensing NDPA Announcement |
| 01 | Control | 0010 | Trigger |
| 01 | Control | 0101 | VHT/HE NDP Announcement |

Technical Feature 1. A. ii. 2. The above Table 4 is only an example, and the Sensing NDPA frame (in this specification, the Sensing NDPA frame may be interchangeable with SNDPA frame) may be indicated via the other reserved values 0000 or 1111.

Technical Feature 1. A. iii. The Sensing NDPA frame can be clearly distinguished from NDPA for other purposes because the presence of a Sensing NDPA frame is indicated by a separate Frame control field as described above. Also, the NDPA frame can be redesigned for sensing.

Technical Feature 1. A. iii. 1. For example, the Sensing NDPA frame may be configured as follows.

Technical Feature 1. A. iii. 1. A. The Sounding Dialog Token field contained in the Sensing NDPA frame may be redesigned.

Technical Feature 1. A. iii. 1. A. i. Unlike before, bits B0 and B1 do not need to be allocated for the NDP Announce variant field, so they can be used for other information.

Technical Feature 1. A. iii. 1. A. i. 1. The 2-bit field may be used to indicate identification (ID) information about the sensing measurement.

Technical Feature 1. A. iii. 1. A. i. 2. The information about the identification of the sensing measurement may indicate a sensing measurement ID/sensing measurement setup ID/sensing session ID.

Technical Feature 1. A. iii. 1. A. ii. Except for the above B0 and B1, the remaining B2 to B7 (6 bits) may be used to indicate multiple measurement instances/bursts in one sensing measurement procedure.

Technical Feature 1. A. iii. 1. A. ii. 1. For example, if a channel measurement is performed using three measurement instances/bursts in one sensing measurement procedure, the six bits may be used to indicate each measurement instance/burst. That is, for the first measurement instance/burst, the B2 to B7 values may be set to 0, for the second measurement instance/burst, the B2 to B7 values may be set to 1, and for the third measurement instance/burst, the B2 to B7 values may be set to 2. The device/STA that receives the measurement instance/burst can use the above information to determine which measurement frame it has received.

Technical Feature 1. A. iii. 1. A. iii. As described above, the measurement ID and the measurement instance/burst ID are indicated using a 2-bit+6-bit combination. The bits/fields for the above information may be configured differently than described above.

Technical Feature 1. A. iii. 1. A. iii. 1. In one example, the bits/fields for the measurement ID and measurement instance/burst ID may be configured differently from the above, such as a combination of 3 bits+5 bits/4 bits+4 bits.

Technical Feature 1. A. iii. 1. B. Upon receiving the Sounding Dialog Token field transmitted via the Sensing NDPA frame, the sensing STA/AP may include the information contained in the Sounding Dialog Token field and the measurement information in the reporting frame when transmitting a reporting frame (in this specification, the reporting frame may be interchangeable with the feedback frame) to feedback the measurement information (in this specification, the measurement information may be interchangeable with the feedback information).

Technical feature 1. A. iii. 1. B. i. The information contained in the Sounding Dialog Token field may be included in the Measurement report control field and the Measurement report field for sensing measurement feedback.

Technical Feature 1. A. iii. 1. B. ii. Using the information contained in the above Sounding Dialog Token field, the sensing STA/AP receiving the feedback information can determine which measurement and for which measurement instance/burst the feedback information relates.

Technical Feature 1. A. iii. 1. B. iii. Unlike the above, when transmitting feedback information, only part of the information contained in the previously received Sounding Dialog Token field may be transmitted with the feedback information.

Technical Feature 1. A. iii. 1. B. iii. 1. For example, if the Sounding Dialog Token field consists of 2 bits for the measurement ID and 6 bits for the measurement instance/burst ID, then when the sensing STA/AP transmits a reporting frame/feedback frame containing feedback information, only 6 bits of the Sounding Dialog Token field for the measurement instance/burst ID may be included in the reporting frame/feedback frame.

Technical Feature 1. A. iii. 1. B. iii. 1. A. For example, only 6 bits for the measurement instance/burst ID may be included in the measurement reporting control field and the measurement reporting field.

Technical Feature 1. A. iii. 1. C. The above information, e.g., the Sounding Dialog Token field, may also be used when the sensing STA/AP that transmitted the sensing measurement frame requests post-measurement feedback information from the responder STA/AP.

Technical Feature 1. A. iii. 1. C. i. Here, the information may be included in the feedback request frame and/or the Trigger Frame.

Technical Feature 1. A. iii. 1. C. i. 1. For example, the information may be included in the measurement reporting control field of the feedback request frame.

Technical Feature 1. A. iii. 1. C. ii. The Sensing STA/AP may use the above information to request feedback information for desired/intended measurements or feedback information that has not been received.

Technical Feature 1. B. Reserved Subtype field, i.e., the reserved bit of the Subtype field may be used for the indication of an enhanced NDPA frame. In this case, the NDPA version field or the NDPA type field may be used in conjunction with the above Subtype field to indicate the Sensing NDPA frame.

Technical Feature 1. B. i. The enhanced NDPA frame may be an NDPA frame that is different from a conventional NDPA frame, i.e., an enhanced NDPA frame may be an NDPA frame supported by a specification beyond the previously defined specifications such as 11ac, 11ax, 11az, 11be, etc.

Technical Feature 1. B. ii. The NDPA frame may be transmitted via a control frame. In this case, a reserved value in the Subtype field of the control frame may be used to indicate the enhanced NDPA frame.

Technical Feature 1. B. iii. Bits B4 through B7 (i.e., fifth through eighth bits) of the Frame control field may be used for the indication of the enhanced NDPA frame. In this case, the reserved value 0000, 0001 or 1111 may be used for the indication of the enhanced NDPA frame.

Technical Feature 1. B. iv. When an STA receives an enhanced NDPA frame, the STA may determine that the frame is not a conventional NDPA frame through the Subtype field.

Technical Feature 1. B. iv. 1. For example, if the reserved value 0001 is used for the indication of the enhanced NDPA frame, the following table may be defined for the Frame control field.

TABLE 5

| Type value (B3 B2) | Type description | Subtype value (B7 B6 B5 B4) | Subtype description |
|---|---|---|---|
| 01 | Control | 0000 | Reserved |
| 01 | Control | 0001 | Enhanced NDPA Announcement |
| 01 | Control | 0010 | Trigger |
| 01 | Control | 0101 | VHT/HE NDP Announcement |

Technical Feature 1. B. iv. 2. The above table is an example, and other reserved values for enhanced NDPA, such as 0000 or 1111, may be used for the indication of the enhanced NDPA frame.

Technical Feature 1. B. v. Since the indication of the enhanced NDPA frame are carried out through a separate Frame control field as described above, the enhanced NDPA frame can be distinguished from NDPA frames for other purposes. In addition, the enhanced NDPA frame can be designed as follows to distinguish it according to the next generation wireless LAN system standards.

Technical Feature 1. B. v. 1. For example, the enhanced NDPA frame may be configured as follows.

Figure 17:
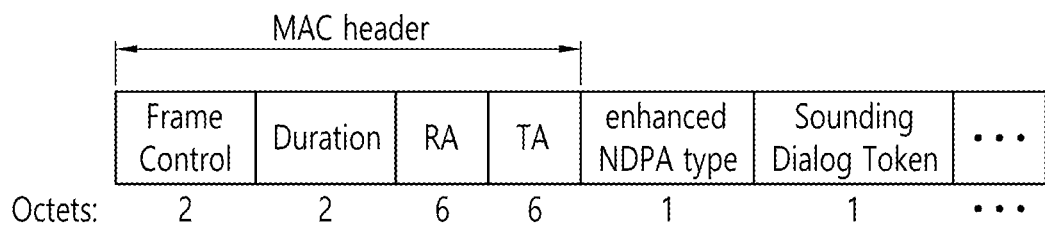
FIG. 17 illustrates an example of an enhanced NDPA frame constructed based on Technical Feature 1. B. v. 1. A.

Technical Feature 1. B. v. 1. A. The enhanced NDPA frame may include an enhanced NDPA type subfield to indicate the type of enhanced NDPA frame. FIG. 17 illustrates an example of an enhanced NDPA frame constructed based on Technical Feature 1. B. v. 1. A.

Technical feature 1. B. v. 1. B. In one example, the length of the enhanced NDPA type subfield may be 3 bits. In this case, the remaining bits may be reserved.

Technical Feature 1. B. v. 1. B. i. In this case, the 3 bits, i.e. the value indicated by the enhanced NDPA type subfield, may be defined/set as follows.

Technical Feature 1. B. v. 1. B. i. 1. If the value is 0, the enhanced NDPA frame may be an NDPA frame for sensing or an NDPA frame for 1 lbf specification.

Technical Feature 1. B. v. 1. B. i. 2. The remaining values (i.e., 1 through 7) may be reserved for specifications of next generation wireless LAN systems.

Technical Feature 2. The Sounding Dialog Token field may be used to indicate the Sensing NDPA frame.

Figure 18:
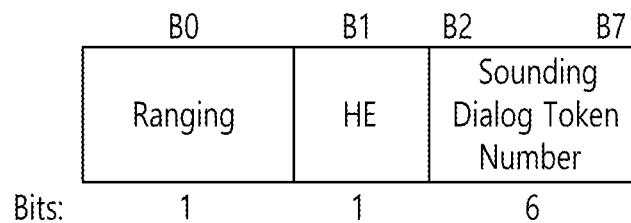
FIG. 18 illustrates an example of a Sounding Dialog Token field format.

Technical Feature 2. A. The Sounding Dialog Token field included in the NDPA frame may consist of one octet. FIG. 18 shows an example of the Sounding Dialog Token field format. For example, the following table may be defined for the indication of NDPA frames according to PPDU type.

TABLE 6

| Ranging | HE | Description |
|---|---|---|
| 0 | 0 | VHT NDPA |
| 0 | 1 | HE NDPA |
| 1 | 0 | Ranging NDPA |
| 1 | 1 | EHT NDPA |

Technical Feature 2. B. Bits B0 and B1 of the Sounding Dialog Token field for a Sensing NDPA frame may be set to the same as for a Ranging NDPA frame. In this case, to distinguish it from the Ranging NDPA frame, the indication of the Sensing NDPA frame may be performed using 1 bit of the Sounding Dialog Token Number field (e.g., B2 of the Sounding Dialog Token field).

Technical Feature 2. B. i. The 1 bit allocated for the indication of the Sensing NDPA frame (e.g., B2 above) may be used exclusively for the indication of the Sensing NDPA frame. Alternatively, the one bit (e.g., B2 above) allocated for the indication of the Sensing NDPA frame may be used for the indication of the Sensing NDPA frame in conjunction with B0 and B1 of the Sounding Dialog Token field.

Technical Feature 2. B. ii. The 1 bit allocated for the indication of the Sensing NDPA frame may be one of the 6 bits (B2 to B7) of the Sounding Dialog Token field. For example, the 1 bit may be set to B2, which is the most significant bit (MSB) of B2 to B7.

Technical Feature 2. B. iii. The Sounding Dialog Token field for the Sensing NDPA frame may be set as follows.

Technical Feature 2. B. iii. 1. Two bits [B0B1] of the Sounding Dialog Token field may be set to [10], and B2 of the Sounding Dialog Token field may be set to 1.

Technical Feature 2. B. iii. 1. A. The values of B0 and B1 above are exemplary, and [B0B1] may be set to [01] or [11].

Technical Feature 2. B. iii. 1. B. The indication in the Sensing NDPA frame may be performed with fixed values for B0 and B1 and B2 set to 1.

Technical Feature 2. B. iii. 2. The B2 may be set to either the Sensing field or the Sensing NDPA field.

Figure 19:
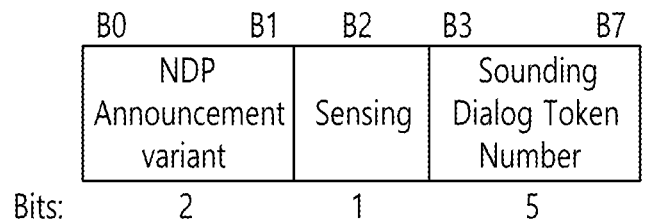
FIG. 19 illustrates an example of a Sounding Dialog Token field format for a Sensing NDPA frame.

Technical feature 2. B. iii. 3. The Sounding Dialog Token field of the Sensing NDPA frame, considering B0, B1 and B2 above, may be configured as shown in FIG. 19. FIG. 19 illustrates an example format of the Sounding Dialog Token field of a Sensing NDPA frame.

The Sounding Dialog Token Number fields (B3 through B7) in FIG. 19 may be used as identification information for multiple sensing measurements transmitted in a sensing measurement. Namely, sensing measurement instances/bursts may be distinguished by these fields. When feedbacking information measured via a sensing measurement instance/burst, the value indicated by the Sounding Dialog Token Number field received via the Sensing NDPA frame may be included in the feedback frame or the reporting frame. In this case, the value indicated by the Sounding Dialog Token Number field may be used to indicate which feedback frame or reporting frame is for which sensing measurement instance/burst.

Technical Feature 2. B. iii. 4. A. In one example, the Sounding Dialog Token field of a Sensing NDPA frame may be configured as follows.

Technical Feature 2. B. iii. 4. A. i. [B0B1] may be set to [01].

Technical Feature 2. B. iii. 4. A. ii. B2 may be set to 1.

Technical Feature 2. B. iii. 4. A. iii. B3 through B7, i.e., the Sounding Dialog Token Number field, may indicate a value from 0 to 31.

Technical feature 2. B. iii. 4. A. iii. 1. When the sensing STA/AP receiving the Sounding Dialog Token Number field receives an NDPA frame and a feedback frame for the transmission of the NDP frame, the value indicated by the Sounding Dialog Token Number field may be included in the feedback frame, i.e., the Sounding Dialog Token Number field may be used to distinguish which sensing measurement instance/burst the feedback information is for.

Technical Feature 2. B. iii. 4. A. iv. The value indicated by the Sounding Dialog Token Number field may be replaced by the Sensing Measurement Instance/Burst ID.

Technical Feature 2. B. iii. 4. B. With the above information, the sensing STA/AP that receives the feedback information can determine which measurements were used to acquire/generate the received feedback information.

Technical Feature 2. C. Unlike the method where the values of B0 and B1 and B2 are set to 1 to indicate the Sensing NDPA frame, the indication of the Sensing NDPA frame can be performed through the value of B2 only.

Technical Feature 2. C. i. For example, the indication of the Sensing NDPA frame may be based on B2 being set to 1. In this case, B0 and B1 may be used to indicate the frame format of the NDP frame used for the Sensing NDPA measurement.

Technical Feature 2. D. B7 of the Sounding Dialog Token field may be used as a flag bit for indication of the Sensing NDPA frame.

Technical Feature 2. D. i. If the indication of the Sensing NDPA frame is carried out via B7 in the Sounding Dialog Token field of the Sensing NDPA frame, the Sounding Dialog Token field may be set as follows.

Technical Feature 2. D. i. 1. Bits B0 and B1 may be configured as follows.

Technical Feature 2. D. i. 1. A. Bits B0 and B1 may be determined by the capabilities of the STA participating in the sensing measurement or by the 802.11 specification/protocol used. For example, if the STA participating in the sensing is an 11ax device, the above [B0B1], i.e., the NDPA variant field, may be set to [01], a value indicating the HE NDPA frame form (variant).

Technical Feature 2. D. i. 1. B. Bits B0 and B1 may be set to values indicating a specific NDPA frame form. For example, for the Sensing NDPA frame, [B0B1] may be fixed to [01], indicating a ranging NDPA frame type.

Technical Feature 2. D. i. 2. The B7 may be set to a Sensing NDPA field. For a Sensing NDPA frame, the bit (B7) may be set to 1.

Figure 20:
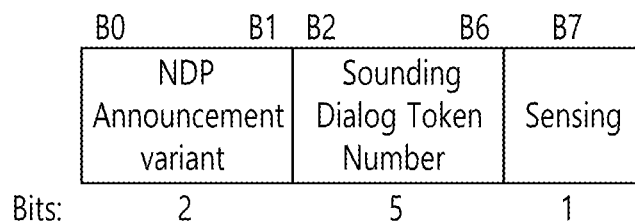
FIG. 20 illustrates another example of a Sounding Dialog Token field format in a Sensing NDPA frame.

Technical Feature 2. D. i. 3. The Sounding Dialog Token field of the Sensing NDPA frame considering B0, B1 and B7 may be configured as shown in FIG. 20. FIG. 20 illustrates another example of the format of the Sounding Dialog Token field of the Sensing NDPA frame.

Technical Feature 2. D. i. 3. A. The Sounding Dialog Token Number fields (B2 through B6) in FIG. 20 may be used as identification information/identifiers for multiple sensing measurements transmitted in a sensing measurement, i.e., each of the sensing measurement instances/bursts may be distinguished by these fields. If the STA reports back (feedbacks) the information measured by the sensing measurement instances/bursts, the STA may include in the feedback frame or reporting frame the value of the Sounding Dialog Token Number field (or Sounding Dialog Token Number) received in the Sensing NDPA frame at the time of feedback. The value may be used to indicate which feedback frame or reporting frame is for which sensing measurement instance/burst.

Technical Feature 3. A Special User Field may be defined/used for indication in the Sensing NDPA frame. In this specification, the Special User Field may be used interchangeably with a Special STA Information Field and/or a Special User Information Field.

Technical Feature 3. A. The Sensing NDPA Frame may be configured to include the Special User Field.

Technical Feature 3. B. The Sensing NDPA frame may contain the same Sounding Dialog Token field as the Ranging NDPA frame. The field may be one byte in length.

Technical Feature 3. C. The NDP Announce variant field in a Sensing NDPA frame may be set to the same as in a Ranging NDPA frame.

Technical Feature 3. C. i. For example, the NDP Announce variant field, i.e., [B0B1] in the Sounding Dialog Token field, may be set to [10].

Technical Feature 3. C. ii. As an example of Technical Feature 3. C. i. above, [B0B1] in the Sounding Dialog Token field may be set to a value indicating a different variant (e.g., [01] indicating an HE variant).

Technical Feature 3. D. The value indicated by the Sounding Dialog Token Number field in the Sounding Dialog Token field contained in the Sensing NDPA frame may be used as the measurement instance ID.

Technical Feature 3. D. A. A Sounding Dialog Token Number field with a length of 6 bits may be used to represent the measurement instance ID. The name of this field may remain the same or may be changed to Measurement Instance ID.

Technical Feature 3. E. To distinguish between Ranging and Sensing NDPA frames, a Special User Field included in the Sensing NDPA frame may be placed before the user field (in this specification, the user field may be interchangeably replaced by the STA Information Field).

Technical Feature 3. E. A. The Special User Field may include a specific Association Identifier (AID) to distinguish it from other user fields.

Technical Feature 3. E. B. The Special User Field may be configured to contain common information about the sensing measurement.

Technical Feature 3. F. The indication of the Sensing NDPA frame may be based on the AID value in the Special User Field. The AID value may be set as follows Technical Feature 3. F. i. For example, the specific AID of the Special User Field for sensing indication may be set to one of the following values.

Technical feature 3. F. i. 1. Among the AID values, one of the reserved values, e.g., 2008 to 2044, 2047 to 4094, may be used as the specific AID. In one example for the specific AID, the value of the specific AID may be 2007, 2008, 2044, or 2047.

Technical Feature 3. G. The Special User Field may include one or more of the following information.

Technical Feature 3. G. i. Information about the Sensing Group ID/Measurement Setup ID.

Technical Feature 3. G. i. 1. The group ID of the sensing STA performing the sensing operation may be included in the above Special User Field.

Technical Feature 3. G. i. 2. Identification information for determining the attributes of the sensing measurement instance may be included in the Special User Field.

Technical Feature 3. G. ii. Information about the number of sensing measurement instances/bursts.

Technical Feature 3. G. ii. 1. The information may be used to indicate a number of sensing measurement instances/bursts in which one sensing measurement is performed.

Technical Feature 3. G. iii. Information about the sensing feedback type indication.

Technical Feature 3. G. iii. 1. The information may refer to information about the type of feedback received from the sensing measurement.

Technical feature 3. G. iii. 1. A. The information may comprise one bit or two bits. The information may be used to indicate the information described later.

Technical Feature 3. G. iii. 1. A. i. Channel status information (CSI).

Technical Feature 3. G. iii. 1. A. ii. Compressed channel status information.

Technical Feature 3. G. iii. 1. A. iii. Channel quality information (CQI).

Technical Feature 3. G. iii. 1. A. iv. Threshold CSI.

Technical Feature 3. G. iv. Feedback Information.

Technical Feature 3. G. iv. 1. The information may include information about measurement feedback. The information may comprise the information described later.

Technical Feature 3. G. iv. 1. A. Information about Ng.

Technical Feature 3. G. iv. 1. A. i. The information may be information about feedback granularity (tone spacing). As an example of the tone interval, 1, 2, 4, or 8 tones may be used.

Technical Feature 3. G. iv. 1. A. ii. The information may be information about the granularity (tone spacing) of the tones to be measured. As an example of the tone spacing, 1, 2, 4 or 8 tones may be used.

Technical Feature 3. G. iv. 1. B. Compressed matrix information (e.g., Nc, Nr) or compressed (quantized) information.

Technical Feature 3. G. iv. 1. B. i. If the measured information is compressed, e.g., CSI, the information may be information about the size of the matrix with respect to the compression.

Technical feature 3. G. iv. 1. B. ii. For the information, the compressed or quantized information may be indicated.

Technical feature 3. G. iv. 1. B. ii. 1. A compressed or quantized level for the measured CSI information may be indicated by the information.

Technical feature 3. G. iv. 1. B. ii. 2. The indicated value may be defined as one of 0, 1, 2, 3, or 4. In this case, the compressed or quantized level may be indicated/set as a power of two.

Technical Feature 3. G. iv. 1. B. ii. A. For example, where the value is 2, the compressed or quantized level used for CSI measurement may be 22.

Technical Feature 3. G. iv. 1. C. Angular information (e.g., Phi, Psy, etc.).

Technical Feature 3. G. iv. 1. C. i. The information may represent bit size information for the angles.

Technical Feature 3. G. iv. 1. D. Information about the size of the codebook.

Technical Feature 3. G. iv. 1. D. i. The information may represent bit size information for the tone information being fed back.

Technical Feature 3. G. iv. 1. D. ii. The information may represent information about the amplitude, angle, or phase of each tone or the tone corresponding to the Ng.

Technical Feature 3. G. iv. 1. D. Information about Nss.

Technical Feature 3. G. v. 1. The information may be information about the number of spatial streams.

Technical Feature 3. G. v. 2. The information may indicate the value of Nss for each of NDPA sounding and TF sounding.

Technical Feature 3. G. v. 2. A. The Nss information for NDPA and the Nss information for TF may be indicated separately using a plurality of fields, or may be indicated using a single field.

Technical Feature 3. G. v. 2. A. i. If individually indicated using multiple fields, the Nss field for the TF and the Nss field for the NDPA may be configured.

Technical Feature 3. G. v. 2. A. ii. When indicated using a single field, the information may be indicated based on partial bits comprising the field. For example, the field may consist of 6/8 bits. In this case, the Nss information for the NDPA and the Nss information for the TF may each be indicated using 3/4 of the bits in the field.

Technical Feature 3. G. vi. Information about delayed feedback.

Technical Feature 3. G. vi. 1. For example, the information may be information to indicate whether feedback information can be transmitted or received immediately after receiving the measurement frame.

Technical Feature 3. G. vi. 2. In one example, the information may be information to indicate whether delayed feedback is supported.

Technical Feature 3. G. vii. Information about the sensing measurement order/measurement configuration.

Technical Feature 3. G. vii. 1. Both UL (trigger frame-based sounding, TF) and DL (NDPA-based sounding, NDPA) sounding can be present within one sensing measurement. Therefore, the information may be intended to indicate which of the UL/DL soundings is performed first.

Technical Feature 3. G. vii. 2. The information may be used to indicate whether performing a measurement for a sensing measurement instance/burst is related to DL sounding (NDPA sounding) or UL sounding (TF sounding).

Technical Feature 3. G. vii. 3. The information may be indicated per (sensing) measurement instance/burst. In this case, the information may be used to indicate which sounding was performed first, UL sounding/DL sounding, for each (sensing) measurement instance/burst. Alternatively, the information may be used to indicate whether the sounding for which the measurement was performed was related to UL sounding or DL sounding.

Technical Feature 3. G. vii. 4. The sensing measurement instance/burst may exist for both TF sounding and NDPA sounding. Therefore, the information may be used to indicate which TF sounding/NDPA sounding is configured within one sense measurement instance. For example, the information may consist of 2/3 bits. In this case, the information may indicate the following information.

Technical Feature 3. G. vii. 4. A. For example, if the information consists of two bits, the information may be configured as shown in Table 7. In Table 7, the TF+NDPA indication may mean that, within a measurement instance, between TF sounding and NDPA sounding, TF sounding is performed first and NDPA sounding is performed next.

TABLE 7

| Value for 2 bit | Configuration of measurement instance |
| --- | --- |
| 0 | NDPA only |
| 1 | TF only |

TABLE 7-continued

| Value for 2 bit | Configuration of measurement instance |
| --- | --- |
| 2 | TF + NDPA |
| 3 | NDPA + TF |

Technical Feature 3. G. vii. 4. B. For example, if the information consists of three bits, the following technical features may apply.

Technical Feature 3. G. vii. 4. B. i. In one example, multiple soundings may be performed within one measurement instance. In this case, the information may be configured as shown in Table 8. Table 8 is an example considering repeated transmissions. In another example, the configuration of values 5 and 7 in Table 8 may be varied, such as (TF+NDPA+NDPA+TF, NDPA+TF+TF+NDPA) and (TF+NDPA+TF, NDPA+TF+NDPA).

TABLE 8

| Value for 3 bit | Configuration of measurement instance |
| --- | --- |
| 0 | NDPA only |
| 1 | NDPA + NDPA |
| 2 | TF only |
| 3 | TF + TF |
| 4 | TF + NDPA |
| 5 | TF + NDPA + TF + NDPA |
| 6 | NDPA + TF |
| 7 | NDPA + TF + NDPA + TF |

Technical Feature 3. G. viii. Information on TF sounding indication.

Technical Feature 3. G. viii. A. The NDPA frame may be used for both Trigger Based (TB) and Non-Trigger Based (NTB) sensing measurements. Therefore, the information may be used to indicate the presence or absence of TF sounding after NDPA sounding.

Technical Feature 3. G. viii. B. The information may consist of one bit. For example, the information may indicate a 1 if TB sounding is present, and the information may indicate a 0 if TB sounding is not present.

Technical Feature 3. G. viii. C. For NTB sensing measurements, the information may be set to 0.

Technical Feature 3. G. ix. Information about Long Training Field (LTF) repetition.

Technical Feature 3. G. ix. 1. The information may be used when transmitting an NDP frame to indicate whether to repeat the LTF of the NDP frame and the repeat value/number of times.

Technical Feature 3. G. x. Information about inactive or available channels.

Technical Feature 3. G. x. 1. The information may include information about preamble puncturing or inactive channels in the bandwidth for the PPDU. Wherein, the information may be configured based on 20 MHz units.

Technical Feature 3. G. x. 1. A. In one example, the information may be configured with 8 bits or 16 bits, considering the 20 MHz subchannel indication.

Technical Feature 3. G. x. 1. B. In another example, the information may be indicated based on different resolutions depending on the bandwidth to reduce signaling overhead and support different puncturing methods.

Technical Feature 3. G. x. 1. B. i. For example, when the bandwidth is 160 MHz or less, the information may be indicated in 20 MHz units. Further, if the bandwidth is 320 MHz, the information may be indicated in 40 MHz units.

Technical Feature 3. G. x. 1. B. ii. The information may comprise a 1-bit field to indicate the resolution bandwidth (e.g., a 1-bit field to indicate whether the subchannel units are 20 MHz or 40 MHz) and an 8-bit field to indicate the availability per subchannel.

Technical Feature 3. G. x. 1. B. ii. 1. For example, the information may be configured identically to the Partial BW info field in 11be.

Technical Feature 3. G. x. 1. B. ii. 2. For example, the information may be expressed as a requested feedback bandwidth to the sensing STA, i.e. a bandwidth that should be reported after measurement, identical to the 11be Partial BW info field.

Technical Feature 3. G. x. 2. In another example, the information may be represented as bandwidth information including puncturing.

Technical Feature 3. H. The sensing parameters listed in the above technical features may be included in the user information field included in the Sensing NDPA frame.

Technical Feature 4. The Sensing NDPA Frame may utilize either the Ranging NDPA Frame Format or the EHT NDPA Frame Format.

Technical Feature 4. A. The Sensing NDPA frame may utilize any of the previously defined NDPA variants. For sensing indication, B31 of the user information field may be used as a bit for sensing indication.

Technical Feature 4. A. i. For example, if the NDPA type is Ranging or EHT, and the value of B31 of the user information field in the NDPA frame is set to a specific value, the specific value may indicate that the NDPA frame is a Sensing NDPA frame.

Technical Feature 4. A. i. 1. For example, the specific value for B31 may be set to 0 or 1.

Technical Feature 4. A. ii. When the value of B31 is set to a specific value, the user information field may be configured differently than the user information field of a conventional ranging NDPA frame or an EHT NDPA frame. For example, when the value of B31 is set to a certain value, the user information field may be reconfigured as sensing parameters, or may additionally include information of the aforementioned technical features.

Each of the foregoing technical features may be used alone or in combination. For example, Technical Feature 3 and Technical Feature 4 may be used in combination for a Sensing NDPA frame. In this case, the following Configurations may be further applied.

Configuration 1. [B0B1] of the Sounding Dialog Token field in the Sensing NDPA frame may be set to the same as in the Ranging NDPA frame.

Configuration 1. A. For example, [B0B1] in this field may be set to [10].

Configuration 2. A Special User Information field or a Special STA Information Field may be included before the user information field in the Sensing NDPA frame. The Special User Information field or Special STA Information Field may contain specific AIDs.

Configuration 2. A. The Special User Field may contain common information about the sensing measurement.

Configuration 2. A. i. The common information may comprise a combination of the information comprising the Special User Information field proposed in Technical Feature 3 above.

Configuration 2. A. i. 1. For example, the Special User Information field may include information about the measurement setup ID, available channel information or punctured/puncturing bandwidth information, measurement instance sequence, TF sounding indication, feedback type, delayed feedback, etc.

Configuration 3. A Sensing NDPA frame may reuse the format of a Ranging NDPA frame. In this case, the reserved bit (B31) contained in the user information field of the ranging NDPA frame format may be used for indication in the Sensing NDPA frame.

Configuration 3. A. Through the use of the reserved bits, it is possible to distinguish between Sensing NDPA frames and Ranging NDPA frames. Thus, reuse of existing frame formats may be possible.

In Technical Features 1, 2, 3, and 4 above, the Sounding Dialog Token Number field contained in the Sensing NDPA frame may be used to indicate the sensing measurement setup ID. Additionally, the sensing measurement instance ID may be included in a Special User Information field or user information field included in the Sensing NDPA frame.

Alternatively, in Technical Feature 1, 2, 3, and 4 above, the Sounding Dialog Token Number fields (B2 through B7) included in the Sensing NDPA frame may be used to indicate the Sensing Measurement Instance ID. Additionally, the Sensing Measurement Setup ID may be included in the Special User Information field included in the Sensing NDPA frame.

Technical Feature 5. The indication of the Sensing NDPA frame may be based on the Subtype field in the Frame control field and the Control Frame Extension value (B11, B10, B9, and B8 in the Frame control field). The Control Frame Extension value is defined to extend the Subtype field. Thus, the indication of the Sensing NDPA frame may be performed using these values. For example, the Subtype field of a Sensing NDPA frame may be set to 0110. In this case, the Control Frame Extension value may be set to one of the reserved values 1100 to 1111 for the indication of the Sensing NDPA frame.

For example, the Control Frame Extension value for the indication of the Sensing NDPA frame may be defined/set to 1100. The above values are exemplary, and any of the reserved values may be used to indicate the Sensing NDPA frame.

If the Sensing NDPA Frame is indicated based on the Subtype field and Control Frame Extension value as described above, the Sensing NDPA Frame may be configured as follows.

Figure 21:
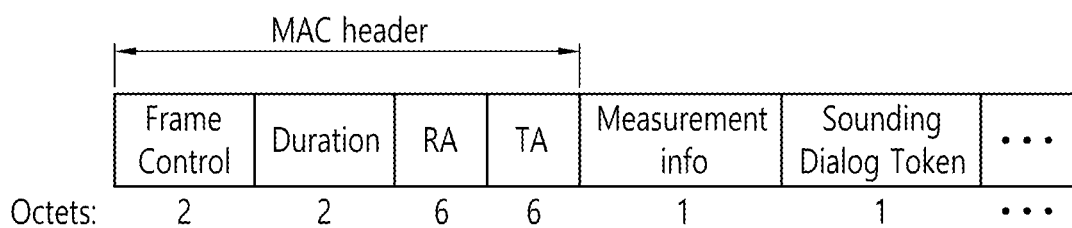
FIG. 21 illustrates an example of a Sensing NDPA frame format.

Configuration 1. The Sensing NDPA frame may be configured to include a Measurement info field. The above field names are exemplary and other names may be used. FIG. 21 shows an example of a Sensing NDPA frame format.

Configuration 1. A. The measurement information fields may be configured as follows.

Configuration 1. A. i. The measurement information field may include an NDPA variant subfield.

Configuration 1. A. i. 1. The subfield may be used to indicate the NDP frame format/PHY format used for the sensing measurement.

Configuration 1. A. i. 1. A. For example, the subfield may indicate a PHY PPDU format used for transmission of the NDP frame. For example, the subfield may include information about an 11ac, 11ax, 11be, or next generation wireless LAN system standard.

Configuration 1. A. i. 1. A. i. In one example, the subfield may consist of 3 bits. The value indicated by the subfield may indicate the following specifications.

Configuration 1. A. i. 1. A. i. 1. If the subfield indicates 0, then the PHY PPDU format may support the 11ac specification.

Configuration 1. A. i. 1. A. i. 2. 2. if the subfield indicates 1, the PHY PPDU format can support the 11ax specification.

Configuration 1. A. i. 1. A. i. 3. If the above subfield indicates 2, the PHY PPDU format may support the 11be specification.

Configuration 1. A. i. 1. A. i. 4. Values 3 through 7 may be values used for next generation WLAN system specifications.

Configuration 1. A. ii. The Measurement Information field can contain information about the measurement setup ID.

Configuration 1. A. ii. 1. Measurement Setup ID may mean the measurement setup ID performed/used for the sensing measurement.

Configuration 1. A. ii. 1. A. Sounding Dialog Token field may be used to indicate a measurement instance. In this case, the entire field (8 bits) may be used to represent the measurement instance, or some of the fields (e.g., B2 to B7) may be used.

Figure 22:
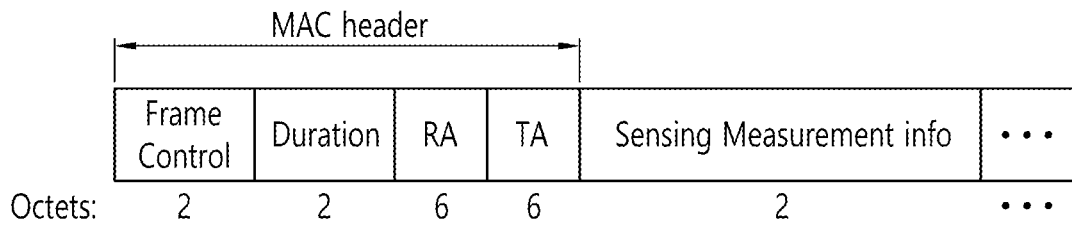
FIG. 22 illustrates another example of a Sensing NDPA frame format.

Configuration 2. The Sensing NDPA frame may include a sensing Measurement info field. The field may be two bytes in length. The name of the field is exemplary and other names may be used. FIG. 22 illustrates another example of a Sensing NDPA frame format.

Configuration 2. A. The sensing measurement information field may be configured as follows.

Configuration 2. A. i. The sensing measurement information field may include an NDPA version identifier (3/4 bit) field. The NDPA version identifier may be used to identify the PHY version or PHY PPDU format for which the sensing measurement is performed. For example, if the NDPA version identifier field consists of 3 bits, the value indicated by the field may indicate the following specifications.

Configuration 2. A. i. 1. If the field indicates 0, then the PHY PPDU format may support 11ac or VHT specifications.

Configuration 2. A. i. 2. if the field indicates 1, the PHY PPDU format can support 11ax or HE specifications.

Configuration 2. A. i. 3. If the above field indicates 2, the PHY PPDU format may support 11be or EHT specifications.

Configuration 2. A. i. 4. Values 3 through 7 may be the values used for the next generation WLAN system specification (or EHT+).

Configuration 2. A. ii. The Sensing Measurement Information field may include a Measurement Setup ID field.

Configuration 2. A. ii. 1. The measurement setup ID may mean a sensing measurement setup ID in which the sensing measurement is performed. The Measurement Setup ID field may consist of 4/5/6 bits.

Configuration 2. A. iii. The Sensing Measurement Information field may include a field for a Sounding Dialog Token Number or a Measurement Instance ID. The Sounding Dialog Token Number or Measurement Instance ID may represent information about the measurement instance for which the measurement is being performed at the time of transmission of the Sensing NDPA Frame.

Alternatively, the Type field and the Subtype field of the Frame Control field may be set as follows to indicate the Sensing NDPA frame. For example, the Type field may be set to 11 to indicate an extension. In this case, the Subtype field may be set to one of the reserved values 0010 through 1111.

For example, when transmitting a Sensing NDPA frame, the Type field may be set to 11 and the Subtype field may be set to 0010. By way of example only, the value of the Subtype field may be set to one of the reserved values.

In the following, it is proposed to utilize the Frame Control field not only for the Sensing NDPA frame, but also for indicating NDPA frames that support next-generation wireless LAN system standards/protocols, i.e., enhanced NDPA frames. The following methods can be considered for the indication of enhanced NDPA frames.

Method 1. Using the Subtype field within the Frame Control field.

Method 1. A. For the indication of an enhanced NDPA frame, the value of the Subtype field in the Frame Control field may be set to 0110 indicating a Control Frame Extension. Then, for the indication of the enhanced NDPA frame, the Control Frame Extension value may be set to one of the reserved values 1100-1111. For example, for the indication of the enhanced NDPA frame, the Control Frame Extension value may be set to 1100. It should be noted that 1100 is an example, and the Control Frame Extension value may be set to any one of the reserved values.

Method 1. B. To indicate that the enhanced NDPA frame is to be used for sensing measurements, or to indicate the frame format of the enhanced NDPA frame used for sensing, the enhanced NDPA frame may be designed as follows.

Method 1. B. i. An enhanced NDPA type field or an extended subtype field to indicate the type or version of the enhanced NDPA frame may be configured after the MAC header of the enhanced NDPA frame.

Method 1. B. i. 1. The enhanced NDPA type field or extended subtype field may consist of three or four bits. In this case, the remaining bits may be reserved or used to indicate other information.

Method 1. B. i. 1. A. For example, if the enhanced NDPA type field or extended subtype field consists of three bits, the enhanced NDPA type field or extended subtype field may be configured as follows.

Method 1. B. i. 1. A. i. For example, if the value indicated by the enhanced NDPA type field or extended subtype field is 0, the value may indicate that the enhanced NDPA frame is a Sensing NDPA frame, i.e., supports the 1 lbf specification.

Method 1. B. i. 1. A. ii. For example, if the value indicated by the enhanced NDPA type field or the extended subtype field is between 1 and 7, the value may indicate that the enhanced NDPA frame supports a newly defined specification after 1 lbf or 11be.

Method 1. B. i. 1. B. The remaining bits (bits 4 or 5) may be used to indicate a setup ID for sensing measurements.

Method 1. B. i. 1. C. In another example, if the enhanced NDPA type field or extended subtype field indicates support for the Sensing NDPA frame or 1 lbf specification, the remaining bits may be used to indicate the PHY version or format in which the Sensing NDPA frame is transmitted. For example, if the remaining bit is 4 bits, the following methods may be defined Method 1. B. i. 1. C. i. If the value indicated by the remaining bit is 0, then the PHY version or format in which the Sensing NDPA frame is transmitted may be VHT.

Method 1. B. i. 1. C. ii. If the value indicated by the remaining bits is 1, the PHY version or format in which the Sensing NDPA frame is transmitted can be HE.

Method 1. B. i. 1. C. iii. If the value indicated by the remaining bits is 2, the PHY version or format in which the Sensing NDPA frame is transmitted may be EHT.

Method 1. B. i. 1. C. iv. If the value indicated by the remaining bits is 3 to 15, the PHY version or format in which the Sensing NDPA frame is transmitted may be a next generation WLAN system standard after EHT.

Method 1. B. i. 1. D. In another example, the indication may be performed via a 3-bit field.

Method 1. B. i. 1. E. In one example, the enhanced NDPA frame may comprise the following.

Figure 23:
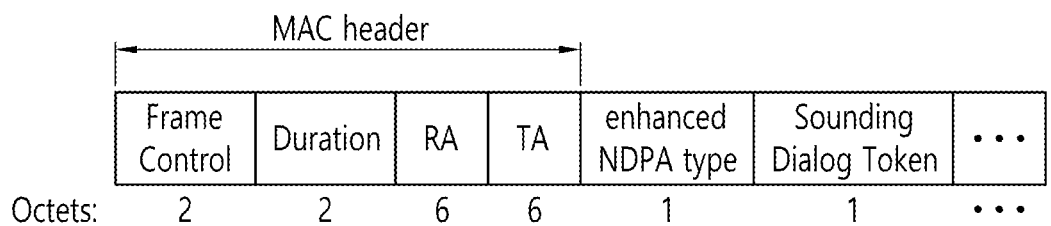
FIG. 23 illustrates an example of an enhanced NDPA frame format.

Method 1. B. i. 1. E. i. An enhanced NDPA type subfield may be included in the enhanced NDPA frame to indicate the enhanced NDPA type. FIG. 23 illustrates an example of an enhanced NDPA frame format.

Method 1. B. i. 1. E. ii. The Sounding Dialog Token field in FIG. 23 may be configured as an NDPA type (variant) field and a Sounding Dialog Token Number field as before. In this case, the NDPA type field may indicate in what format the NDP frame used for the sensing measurement is configured. For example, if the NDP frame utilizes the HE format, the value of the NDPA Type field may be set to a value indicating the HE format.

Method 1. B. i. 1. E. iii. In another example, the Sounding Dialog Token field may comprise a measurement setup ID and a measurement instance ID.

Figure 24:
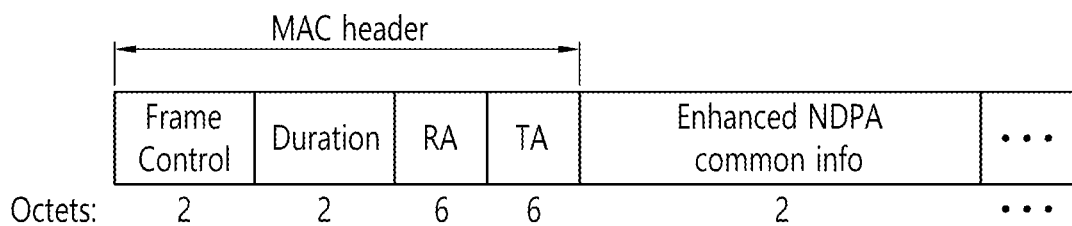
FIG. 24 illustrates another example of an enhanced NDPA frame format.

Method 1. B. ii. The enhanced NDPA frame may include an enhanced NDPA common info field for transmitting common information for the enhanced NDPA frame after the MAC header. In this case, the enhanced NDPA common info field may comprise two bytes. FIG. 24 illustrates another example of an enhanced NDPA frame format.

Method 1. B. ii. 1. The enhanced NDPA common info field of the enhanced NDPA frame may include the following information.

Method 1. B. ii. 1. i. Information about the NDPA version identifier (3/4 bits). This information may indicate which NDPA frames are supported by the WLAN system after the 11be specification. For example, if the field for the information about the NDPA version identifier consists of 3 bits, the value of the field for the information about the NDPA version identifier indicating the Sensing NDPA frame may be 000. ii. The remaining values that may be indicated by the field for information about the NDPA version identifier may be used for NDPA frames supported by next generation wireless LAN systems.

Method 1. B. ii. 1. ii. Information about the measurement setup ID. This information may be included if the information for the NDPA version identifier described above indicates an 1 lbf specification or sensing. The information about the measurement setup ID may indicate the setup ID for the sensing measurement.

Method 1. b. ii. 1. iii. Subfields/information about the NDPA form/format may be included. The subfield/information may be present if the enhanced NDPA frame is an NDPA frame for sensing. If the enhanced NDPA frame is not an NDPA frame for sensing, the subfield/information may be reserved or used to indicate other information.

Method 1. B. ii. 1. iii. 1. The subfield/information may be used to indicate the format of the NDP frame used for the sensing measurement.

Method 1. B. ii. 1. iii. 2. For example, the subfield/information may be used to indicate the PHY PPDU format used for the transmission of the NDP frame. Here, the subfield/information may specify 11ac, 11ax, 11be, and next generation WLAN systems.

Method 1. B. ii. 1. iii. 2. A. For example, if the subfield consists of 3 bits, the following methods may be defined.

Method 1. B. ii. 1. iii. 2. A. i. If the value indicated by the subfield is 0, the PHY version or format in which the NDP frame is transmitted may be 11ac compliant.

Method 1. B. ii. 1. iii. 2. A. ii. If the value indicated by the above subfield is 1, then the PHY version or format on which the NDP frame is transmitted may be 11ax compliant.

Method 1. B. ii. 1. iii. 2. A. iii. If the value indicated by the above subfield is 2, the PHY version or format on which the NDP frame is transmitted may be 11be compliant.

Method 1. B. ii. 1. iii. 2. A. iv. If the value indicated by the above subfield is 3 to 15, the PHY version or format in which the NDP frame is transmitted may be a post-EHT next generation WLAN system standard.

Method 1. B. ii. 1. iv. Sounding Dialog Token Number. When the enhanced NDPA frame is an NDPA frame for sensing, the sounding dialog token number may represent information about the measurement instance for which the measurement is performed.

Method 2. Method of using the Type field within the Frame Control field.

Method 2. A. To indicate an enhanced NDPA frame, the value of the Type field in the Frame Control field may be set to 11.

Method 2. B. In this case, the Subtype field in the Frame Control field may be set to a value of one of the reserved values 0010 through 1111. For example, to indicate an enhanced NDPA frame, the Subtype field may be set to 0010.

Method 2. C. When the Subtype field is utilized to indicate the enhanced NDPA frame, the enhanced NDPA frame may be constructed as in method 1 above.

Figure 25:
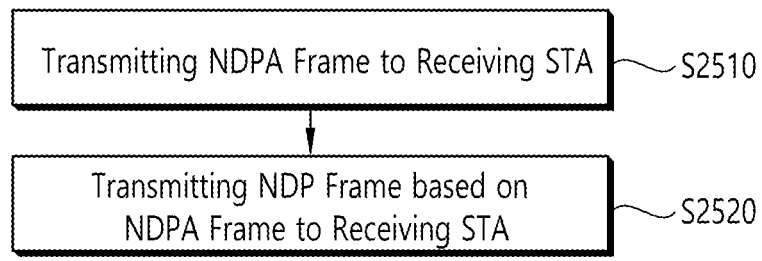
FIG. 25 is a flow diagram of a method performed by a transmitting STA according to some implementations of the present disclosure.

FIG. 25 is a flow diagram of a method performed by a transmitting STA according to some implementations of the present disclosure. The egress STA may be a non-AP STA or an AP STA.

Referring to FIG. 25, the transmitting STA transmits an NDPA frame to the receiving STA (S2510). Subsequently, the transmitting STA transmits an NDP frame based on the NDPA frame to the receiving STA (S2520).

For example, the NDPA frame may be the NDPA frame of FIG. 15 or the NDPA frame of FIG. 16. In other words, the NDPA frame may be an NDPA frame that is transmitted to all responders as shown in FIG. 15. Alternatively, the NDPA frame may be an NDPA frame transmitted to responders that have transmitted a response frame to the TF sensing poll frame, as shown in FIG. 16.

In one example, the NDPA frame may be constructed based on Technical features 3 and Technical features 4 above. Specifically, the NDPA frame may include a Special User Information field. Here, the Special User Information field may comprise an AID field. The AID field may indicate a predefined value for sensing. In one example, the predefined value for sensing may be 2007.

In one example, the Special User Information field may include common information for sensing. The common information for sensing may refer to Technical feature 3. G. and/or Configuration 2. A. above. Specifically, the Special User Information field may include a specific field indicating a preamble puncturing subchannel or an inactive subchannel for a PPDU comprising the NDPA frame and/or bandwidth for a PPDU comprising the NDP frame. Here, information about the subchannel indicated by the specific field may be used for reporting/feedback on sensing measurements performed by the receiving STA. For example, if the specific field indicates a subchannel with preamble puncturing and a subchannel without preamble puncturing, the receiving STA may perform the reporting/feedback only on the subchannel without preamble puncturing.

In one example, the NDPA frame may include one or more user information fields. Here, the Special User Information field may be located prior to the one or more user information fields within the NDPA frame. B31, i.e., the thirty-second bit, included in the one or more user information fields may be used as a field to indicate whether the NDPA frame is an NDPA frame for sensing. Further, B31 and B26 included in the one or more user information fields may be used to indicate whether the NDPA frame is an NDPA frame for sensing. For example, if the B31 indicates 1 and the B26 indicates 0, the NDPA frame may be an NDPA frame for sensing.

For example, based on Technical Feature 5 above, if the NDPA frame is an NDPA frame for sensing, the NDPA frame for sensing may include a Control Frame Extension field, i.e., if the NDPA frame is an NDPA frame for sensing, the Type field of the Frame Control field included in the NDPA frame may indicate 1, and the Subtype field of the Frame Control field may indicate 6. In this case, the control frame extension field of the NDPA frame for sensing may indicate a predefined value for sensing.

Figure 26:
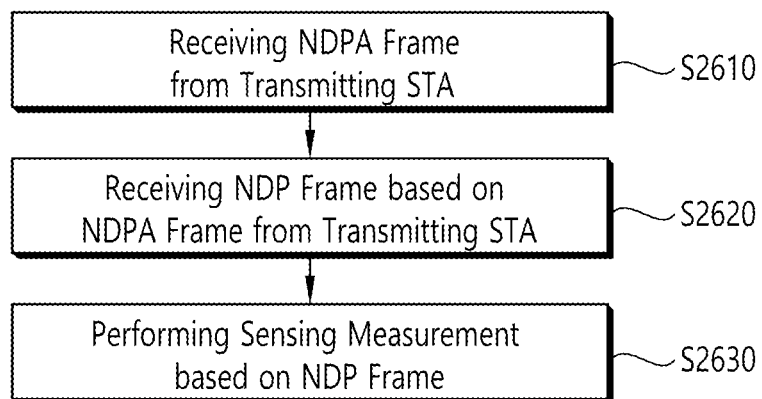
FIG. 26 is a flow diagram of a method performed by a receiving STA according to some implementations of the present disclosure.

FIG. 26 is a flow diagram of a method performed by a receiving STA according to some implementations of the present disclosure. The receiving STA may be a non-AP STA or an AP STA.

Referring to FIG. 26, the receiving STA receives an NDPA frame from the transmitting STA (S2610). Subsequently, the receiving STA receives an NDP frame based on the NDPA frame from the transmitting STA (S2620). The receiving STA performs a sensing measurement based on the NDP frame (S2630).

For example, the receiving STA may be the responder of FIG. 15 or the responder of FIG. 16. In other words, the receiving STA may be an STA that receives the NDPA frame as in FIG. 15. Alternatively, the receiving STA may be a responder that transmitted a response frame to the TF sensing poll frame, as shown in FIG. 16.

Here, the receiving STA may determine whether the NDPA frame is an NDPA frame for sensing based on various methods/technical features/configurations proposed herein. For example, the NDPA frame may include a Special User Information field. The receiving STA may determine that the NDPA frame is an NDPA frame for sensing based on the Special User Information field.

For example, the Special User Information field may include common information for sensing. Specifically, the Special User Information field may include a specific field indicating a preamble puncturing subchannel or an inactive subchannel for the PPDU containing the NDPA frame and/or bandwidth for the PPDU containing the NDP frame.

For example, the NDPA frame may include one or more user information fields. Here, the Special User Information field may be located prior to the one or more user information fields within the NDPA frame. B31, i.e., the thirty-second bit, included in the one or more user information fields may be used as a field to indicate whether the NDPA frame is an NDPA frame for sensing. Further, B31 and B26 included in the one or more user information fields may be used to indicate whether the NDPA frame is an NDPA frame for sensing. For example, if the B31 indicates 1 and the B26 indicates 0, the receiving STA may determine that the NDPA frame is an NDPA frame for sensing.

For example, Technical Feature 5. may be applied to distinguish the NDPA frame for sensing. Specifically, if the NDPA frame is an NDPA frame for sensing, the NDPA frame for sensing may include a Control Frame Extension field, i.e., if the NDPA frame is an NDPA frame for sensing, the Type field of the Frame Control field included in the NDPA frame may indicate 1, and the Subtype field of the Frame Control field may indicate 6. In this case, the control frame extension field of the NDPA frame for sensing may indicate a predefined value for sensing.

The examples of FIGS. 25 and 26 are illustrative of some of the various technical features and configurations proposed herein. Again, it will be appreciated that various technical features and/or configurations proposed herein may be applied to NDPA frames for sensing and NDPA frames for specifications for next generation wireless LAN systems.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method performed in a wireless local area network (WLAN) system, the method comprising:
    transmitting, by a station (STA), a Null Data Packet Announcement (NDPA) frame,
    wherein the NDPA frame includes a Sounding Dialog Token field related to a sensing measurement exchange,
    wherein the NDPA frame includes a STA info field,
    wherein the STA info field includes an Association Identifier (AID) field and a one-bit control field which is located in a thirty-second bit of the STA info field,
    wherein the one-bit control field is denoted by 'B31' in the STA info field,
    wherein the NDPA frame includes a plurality of variants including a Sensing NDPA frame and a Ranging NDPA frame,
    wherein the plurality of variants are distinguished based on two contiguous bits of the Sounding Dialog Token field, the AID field, and the one-bit control field,
    wherein the two contiguous bits of the Sounding Dialog Token field have a same value for the Sensing NDPA frame and the Ranging NDPA frame,
    wherein the STA info field further includes a measurement session identifier (ID) of the sensing measurement exchange; and
    transmitting, by the STA, the null data packet (NDP) frame based on the NDPA frame.

2. The method of claim 1, wherein the Sensing NDPA frame and the Ranging NDPA frame are distinguished based on the one-bit control field.

3. The method of claim 1, wherein the Sounding Dialog Token field includes a Sounding Dialog Token number field which is contiguous to the two contiguous bits.

4. The method of claim 1, wherein the two contiguous bits consist of a B0 bit and a B1 bit, and the B0 bit is set to '1' and the B1 bit is set to '0'.

5. The method of claim 1, wherein the plurality of variants include a very high throughput (VHT) NDPA frame, a high-Efficiency (HE) NDPA frame, an extremely high throughput (EHT) NDPA frame.

6. A station (STA) in a wireless local area network (WLAN) system, comprising:
- a transceiver adapted to transmit and/or receive a wireless signal; and
- a processor adapted to control the transceiver,
- wherein the processor is further adapted to:
- transmit a Null Data Packet Announcement (NDPA) frame,
- wherein the NDPA frame includes a Sounding Dialog Token field related to a sensing measurement exchange,
- wherein the NDPA frame includes a STA info field,
- wherein the STA info field includes an Association Identifier (AID) field and a one-bit control field which is located in a thirty-second bit of the STA info field,
- wherein the one-bit control field is denoted by 'B31' in the STA info field,
- wherein the NDPA frame includes a plurality of variants including a Sensing NDPA frame and a Ranging NDPA frame, wherein the plurality of variants are distinguished based on two contiguous bits of the Sounding Dialog Token field, the AID field, and the one-bit control field,
- wherein the two contiguous bits of the Sounding Dialog Token field have a same value for the Sensing NDPA frame and the Ranging NDPA frame,
- wherein the STA info field further includes a measurement session identifier (ID) of the sensing measurement exchange; and
- transmit the null data packet (NDP) frame based on the NDPA frame.

7. The STA of claim 6, wherein the Sensing NDPA frame and the Ranging NDPA frame are distinguished based on the one-bit control field.

8. The STA of claim 6, wherein the Sounding Dialog Token field includes a Sounding Dialog Token number field which is contiguous to the two contiguous bits.

9. The STA of claim 6, wherein the two contiguous bits consist of a B0 bit and a B1 bit, and the B0 bit is set to '1' and the B1 bit is set to '0'.

10. The STA of claim 6, wherein the plurality of variants include a very high throughput (VHT) NDPA frame, a high-Efficiency (HE) NDPA frame, an extremely high throughput (EHT) NDPA frame.

11. A station (STA) in a wireless local area network (WLAN) system, comprising:
- a transceiver adapted to transmit and/or receive a wireless signal; and
- a processor adapted to control the transceiver,
- wherein the processor is further adapted to:
- receive a Null Data Packet Announcement (NDPA) frame,
- wherein the NDPA frame includes a Sounding Dialog Token field related to a sensing measurement exchange,
- wherein the NDPA frame includes a STA info field,
- wherein the STA info field includes an Association Identifier (AID) field and a one-bit control field which is located in a thirty-second bit of the STA info field,
- wherein the one-bit control field is denoted by 'B31' in the STA info field,
- wherein the NDPA frame includes a plurality of variants including a Sensing NDPA frame and a Ranging NDPA frame, wherein the plurality of variants are distinguished based on two contiguous bits of the Sounding Dialog Token field, the AID field, and the one-bit control field,
- wherein the two contiguous bits of the Sounding Dialog Token field have a same value for the Sensing NDPA frame and the Ranging NDPA frame,
- wherein the STA info field further includes a measurement session identifier (ID) of the sensing measurement exchange; and
- receive the null data packet (NDP) frame based on the NDPA frame.

12. The STA of claim 11, wherein the Sensing NDPA frame and the Ranging NDPA frame are distinguished based on the one-bit control field.

13. The STA of claim 11, wherein the Sounding Dialog Token field includes a Sounding Dialog Token number field which is contiguous to the two contiguous bits.

14. The STA of claim 11, wherein the two contiguous bits consist of a B0 bit and a B1 bit, and the B0 bit is set to '1' and the B1 bit is set to '0'.

15. The STA of claim 11, wherein the plurality of variants include a very high throughput (VHT) NDPA frame, a high-Efficiency (HE) NDPA frame, an extremely high throughput (EHT) NDPA frame.

* * * * *